US006865542B2

(12) United States Patent
Cox et al.

(10) Patent No.: US 6,865,542 B2
(45) Date of Patent: Mar. 8, 2005

(54) METHOD AND SYSTEM FOR ACCURATELY FORECASTING PRICES AND OTHER ATTRIBUTES OF AGRICULTURAL COMMODITIES

(76) Inventors: Thomas L. Cox, Henry Taylor Hall, 427 Lorch St. University of Wisconsin, Madison, WI (US) 53706; Chavas Jean-Paul, Henry Taylor Hall, 427 Lorch St., University of Wisconsin, Madison, WI (US) 53706; Zhu Yong, Henry Taylor Hall, 427 Lorch St., University of Wisconsin, Madison, IL (US) 53706

( * ) Notice: Subject to any disclaimer, the term of this patent is extended or adjusted under 35 U.S.C. 154(b) by 272 days.

(21) Appl. No.: 10/058,002

(22) Filed: Jan. 29, 2002

(65) Prior Publication Data

US 2002/0152111 A1 Oct. 17, 2002

Related U.S. Application Data

(63) Continuation-in-part of application No. 09/775,946, filed on Feb. 2, 2001, now abandoned.

(51) Int. Cl.$^7$ .............................................. G06F 17/60

(52) U.S. Cl. .................................. 705/10; 705/7; 705/8
(58) Field of Search ............................. 705/7, 10, 8, 37

(56) References Cited

U.S. PATENT DOCUMENTS 5,630,070 A * 5/1997 Dietrich et al. ................ 705/8
5,689,418 A * 11/1997 Monson .......................... 702/2
5,897,619 A * 4/1999 Hargrove et al. ............... 705/4

(List continued on next page.)

FOREIGN PATENT DOCUMENTS

WO          Wo0046714      * 8/2000

OTHER PUBLICATIONS

Elimam A.A., "A Decision Support System (DSS) for Agricultural Pesticide Production Planning", Feb. 1995; European Journal of Operational Research, vol. 81, No. 1, pp. 17–34.*

(List continued on next page.)

*Primary Examiner*—Romain Jeanty
(74) *Attorney, Agent, or Firm*—Patrica Smith King

(57) ABSTRACT

Using a general-purpose computer, the method and system of the present invention enables the forecasting of agricultural commodity prices and amounts of consumption, production and trade flows across regions, under a variety of supply and demand, trade and domestic policy scenarios and over an at least annual time period. The method employs a multi-component spatial equilibrium function approximating an inter-regional market in agricultural commodities, such as dairy commodities, and enables the setting of trade and domestic policy instruments to enable forecasting under a variety of forecast scenarios. The function further enables the incorporation of intermediate commodities, in addition to primary and processed commodities, to account for the effects of reconstitution technologies on said forecasted values. The method generally comprises creating an inputs database comprising a definition of the regions and forecast scenarios, and a plurality of dairy sector data spanning a number of recent years including commodity prices and amounts of consumption, production and trade flow in the regions; refining the function; solving the refined function by maximizing a consumer and a producer surplus net of all transaction costs, to generate the forecasts; and, outputting the forecasts to a results database. The method may further solve for an optimal amount of intermediate commodities consumed in the making of the final processed commodities by region under an assumption of optimal use to further refine the forecasts. The system outputs in the forms of graphs, spreadsheets, maps, or other formats can be delivered electronically through various media.

80 Claims, 9 Drawing Sheets

U.S. PATENT DOCUMENTS

2002/0032585 A1    3/2002    Keyes
2002/0042768 A1    4/2002    Kurose et al.
2002/0059091 A1    5/2002    Hay et al.

OTHER PUBLICATIONS

Mayer et al "Progressive Validation of Queensland Horticultural Crop Forecasts", Dec. 1985, Agricultural Systems 0308–521X.*

Russell et al "Development of a crop knowledge base for Europe" discloses a forecasting system to manage a cereal market and to adjust a Common Agricultural Policy.*

Fang et al "Optimization Resource Allocation For Greenhouse Potted Plant Production"; Aug. 1990; American Society of Agricultural Engineers; vol. 33(4).*

Gartel et al; "Structural Models and Automated Alternatives fir Forecasting Farmland Prices"; Sep. 1993; Economic Research Service, Washington, DC., dialog file 6, Accession No. 2023696.*

Anthes "U.S. Agency Cultivates Pockets of Computing Around the Globe"; May 1992; Computerworld v26n21 PP: 43–44; Dialog fi 15, Accession No. 00617264.*

Dialog "USDA: Wheat Outlook"; Nov. 1999, M2 Presswire, Dialog file 20, Accession No. 08238352.*

Unknown (Note: Page from Web Site), "Commodicast—Our Technology," Commodicast.com, Commodicast (US), (Jun. 10, 2002).

Cox, Thomas L. and Jean Paul Chavas, "An interregional analysis of price discrimination and domestic policy reform in the U.S. dairy sector.," Amer. J. Agr. Econ., American Agricultural Economics Association (US), vol. 83 (No. 1), p. 89–106, (Feb. 23, 2001).

Kawaguchi, T., N. Suzuki and H.M. Kaiser, "A spatial equilibrium modelfor imperfectly competitive milk markets.," Amer. J. Agr. Econ., American Agricultural Economics Association (US), vol. 79 (No. 3), p. 851–859, (Aug. 23, 1997).

Whipple, G.D., C. Powe and M. Gray, "An economic analysis of selected U.S. dairy program changes," South J. Agric. Econ., Southern Agricultural Economics Association (US), vol. 17 (No. 2), p. 181–191, (Dec. 23, 1985).

R.A. Dahlgran, "Welfare costs and interregional income transfers due to regulation of dairy markets," Amer. J. Agric. Econ., American Agricultural Economics Association (US), vol. 62 (No. 2), p. 288–296, (May 23, 1980).

Tanjuakio, Rudolfo V., Conrado M. Gempesaw II, and G. Joachim Elterich, "An optimal control framework for interregional dairy policy analysis." S. J. Agric. Econ., 24(2) Dec. 1992, p. 137–147.

* cited by examiner

METHOD AND SYSTEM FOR ACCURATELY FORECASTING PRICES AND OTHER ATTRIBUTES OF AGRICULTURAL COMMODITIES

CROSS-REFERENCES

The present application is a continuation-in-part of co-pending U.S. patent application Ser. No. 09/775,946, now abandoned, filed 2001 Feb. 2, entitled "Method for Forecasting the Effects of Trade Policies and Supply and Demand Conditions on the World Dairy Sector," by inventors Thomas L. Cox, Jean-Paul Chavas and Yong Zhu, which is not admitted to be prior art with respect to the present invention by its mention in this Cross-References section or in the Background section. This application is incorporated herein by this reference.

STATEMENT REGARDING FEDERALLY SPONSORED RESEARCH OR DEVELOPMENT

This invention was made with United States government support awarded by the following agencies: USDA 99-35400-7868.

BACKGROUND

This invention relates to a method and system for using a general-purpose computer for forecasting prices and amounts of production, consumption and inter-regional trade of agricultural commodities across types of commodities (primary, intermediate, processed), over time and under varying trade and domestic policy scenarios. Industries that trade in agricultural commodities that are comprised of constituent components such as dairy, grain, meat and oil seed commodities, require accurate predictions of the prices, production, consumption and trade flow levels of those commodities and their constituent components in order to compete in today's marketplace. In addition, regional variations in supply and demand trends, trade and domestic policies make it difficult to predict the effects of same on agricultural commodity markets. Further complicating the ability to forecast attributes of agricultural commodities are the politically controlled future changes to trade policies regarding tariffs and subsidies on imports and exports of commodities across regions and domestic policies such as price discrimination. Many industries using, producing and/or trading in agricultural commodities and that may themselves be multi-regional, require a method and system for generating accurate forecast information to inform their marketing and procurement decisions across regions and under a fluid landscape of supply and demand trends and policy scenarios.

Increasingly, the market in such agricultural commodities has become component-based. That is, trade in the constituent intermediate component commodities, in addition to the primary and processed commodities themselves, is fueling the economies of many industries. The method and system of the present invention is particularly useful for (but not limited to) the dairy industry in which advances in reconstitution technologies have enabled the increased use of and trade in intermediate commodities. For example, the component based marketing and procurement strategy implications of dairy product development and markets, are driven by the constituent components of milk [milk fat (and fat fractionations), protein (casein, whey protein, and other protein fractionations), and lactose (and lactose fractionations)], rather than by milk itself, the primary commodity. As a result, much of the current world dairy sector demand growth is industrial demand for milk-based ingredients (i.e. intermediate versus final processed demand commodities).

Driving these trends in dairy (and other agricultural) based ingredient demand, are (1) continued advances in food processing and reconstitution technologies, both on the input side (fractionations of milk components) and product side (processes to optimize cost and functionality of processed commodities using the evolving dairy based ingredients); (2) the functional characteristics of input primary or intermediate commodities and final processed commodities; and, (3) the continual search by processors for low cost ingredients and improved product functionality. For example, dairy based component ingredients currently in demand include the intermediate commodities of whey proteins, lactose and milk protein concentrate fractionations of milk.

Knowledge of the future cost and availability of these primary, intermediate and processed dairy commodities across regions, is required to enable industries to formulate management and procurement strategies that optimally allocate the industrial or technological resources employed in the production, consumption and/or trading of the dairy commodities. For example, an industry may decide to substitute lactose for cane or beet sugar in the making of a final commodity if lactose is cheaper, available and allowable as an ingredient in the making of the commodity. Such an industry would need forecast information regarding lactose to formulate long-term regional procurement strategies. Likewise, whey proteins may be used by industries as multifunctional food ingredients with high nutritional value and a wide range of functional properties that allow the development of new products and optimization of existing products with considerable cost savings.

Knowledge of trade and domestic policies and how these might affect the cost and availability of commodities is also useful to industries. For example, advances in processing technologies have led to the production of fractionates of bulk fluid milk, such as milk protein concentrates (MPCs), lactose and de-mineralized lactose, that are widely used in sports drinks, cheese standardization, and a variety of other applications as substitutes for milk powders, evaporated/ condensed milks, and even farm bulk milk. Use of the fractionates instead of the milk powders will affect the markets for both types of commodities. In regions having relatively low tariffs and no import quotas on MPCs, such as the U.S., these products are increasingly attractive to food processors as a way to source cheaper milk solids (and, often increased functionality) from foreign sources. However, U.S. standards of identity for many cheese products, currently do not allow the use of MPC ingredients in the manufacturing process. This has led many processors to circumvent these standards of identity and labeling requirements [e.g., producing "pizza cheese" (for which no specific standard of identity exists] instead of mozzarella cheese). These standards of identity issues, in addition to trade issues, may drive marketing and procurement decisions in affected industries.

For the foregoing reasons, there is a need for a method and system to accurately forecast future prices, production, consumption and trade flows of agricultural commodities and constituent components thereof regionally, on at least an annualized basis, and under variable trade scenarios. The present invention addresses this need by providing a method and system for forecasting a price, an amount of consumption, an amount of production and an amount of trade flow of a plurality of dairy primary, intermediate and processed commodities inter-regionally, so as to enable an optimal allocation of industrial or technological resources employed in the production, consumption or trading of the dairy commodities based on the forecasted values for the commodity prices and amounts of consumption, production and trade flow.

By employing the present invention, an industry dealing at any level of commodity production, use or trade (primary, intermediate, and/or processed) is able to gain the information required to manage for minimal costs and maximal profits. Industries may also manage private stocks of commodities to minimize their economic risks in futures markets depending on forecasted price and availability trends as well as potential changes to trade and domestic policies. They may furthermore use forecasted trends data to increase the functionality of their commodity products and/or open new markets for their final or intermediate commodities.

SUMMARY

The present invention is directed to a method and system for using a general-purpose computer for forecasting the price and amounts of consumption, production and trade flow of primary, intermediate and processed agricultural commodities, so as to enable their use to optimally allocate industrial or technological resources employed in the production, consumption or trading of the commodities based on the forecasted values for the commodity prices and amounts of consumption, production and trade flow.

In one version, the method for forecasting a price, an amount of consumption, an amount of production and an amount of trade flow of a plurality of primary and processed agricultural commodities, comprises (a) creating an inputs database comprising inputting to the inputs database a definition of a plurality of regions, a definition of an at least one forecast scenario in the regions comprising a set of trade policies on the amount of the primary and processed commodities exported and imported between the regions, and a set of domestic policies, one of the forecast scenarios being a base forecast scenario in which the set of trade policies and the set of domestic policies are set to recent values, and inputting a plurality of data from an at least one source database, the data comprising the actual price and amounts of consumption, production and trade flow in the regions over a plurality of recent years, said trade flow comprising an amount of imports and an amount of exports of the primary and processed commodities; (b) refining a multi-component spatial equilibrium function approximating an inter-regional market in the primary and processed commodities; (c) forecasting the price and amounts of consumption, production and trade flow of the primary and processed commodities in the regions, by solving the refined function under one of the at least one forecast scenarios over an at least annual time period; (d) if more than one forecast scenario is defined, repeating the forecasting step under each of the forecast scenarios; (e) outputting the forecasted price and amounts of consumption, production and trade flow of the primary and processed commodities to a results database and using the forecasts in deciding how to optimally allocate industrial or technological resources employed in the production, consumption or trading of the agricultural commodities; (f) solving the function comprises maximizing a consumer and a producer surplus net of all of a plurality of transaction costs; and, (f) the equilibrium function comprises the function 210.

In another version of the method, the equilibrium function comprises the function 220 and the method further comprises data and forecasts of intermediate commodities, in addition to primary and processed commodities, to thereby account for the affects of reconstitution technologies on the agricultural sector.

In another version of the method creating the database further comprises values for a cost of transporting and marketing the primary, intermediate and processed commodities, and a cost of processing the primary and intermediate commodities into the processed commodities.

In another version, the method utilizing the function 220 further comprises solving for an optimal amount of intermediate commodities consumed in the making of the final processed commodities by region under an assumption of optimal use, given the forecasted amount of final processed commodities produced and an amount of intermediate commodities available for consumption in each of the regions.

In another version, the agricultural commodities are dairy commodities.

In another version, an apparatus is provided having means for performing one or more of the processes described above.

In another aspect, a program storage device, readable by a machine, tangibly embodying a program of instructions executable by the machine is provided to perform one or more of the processes described above.

In another aspect, an article having a computer-usable medium has computer-readable program code embodied in the medium for performing one or more of the processes described above.

In another aspect, a computer program product is provided to perform one or more of the processes described above.

These and other features and aspects of the method and system will become better understood with reference to the following description, accompanying drawings, and appended claims.

Several objects and advantages of the present invention are to provide:

a) means for accurately approximating a multi-regional market in agricultural commodities by expressly accounting for inter-regional variations in trade in primary, intermediate and processed commodities and the trade and/or domestic policies that affect the trade so as to enable the accurate forecasting of the prices and amounts of production, consumption and trade flow of those commodities across regions and under variable forecast scenarios;

b) a method and system for accurately forecasting future prices, production, consumption and trade flows of agricultural commodities and components thereof regionally, on at least an annualized basis, and under variable trade and/or domestic policy forecast scenario;

c) a method and system for accurately forecasting agricultural commodity price production, consumption and trade flow levels that enables the incorporation of optimization functions to refine the forecasts of intermediate commodities use and thereby the final forecasts for attributes of all commodities and to reflect the effects of reconstitution technologies on the agricultural commodities market; and, d) a method and system for accurately forecasting future prices, production, consumption and trade flows of agricultural commodities and components thereof regionally, that enables a user to determine the regions at a global, national (e.g., U.S., Canada, Japan, etc.), or other regional (E.U.; U.S. and Canada; U.S., Canada and E.U., etc.) level.

Whereby a management and procurement tool is provided to enable managers in industries that utilize agricultural commodities to generate accurate price forecasts for commodities with constituent components, and to furthermore utilize information regarding optimal component mixtures to further refine those forecasts, so as to enable the minimizing of an industry's market risk and the maximizing of profits by informing their decisions under variable forecast scenarios, in regard to commodity procurement strategies, investments in the regional markets for said commodities, the management of stocks of commodities, futures contracting, and the like.

The reader is advised that this summary is not meant to be exhaustive. Further features, aspects, and advantages of the present invention will become better understood with reference to the following description, accompanying drawings and appended claims. In particular, though the invention is described in its application to dairy commodities, it may also be applied to other types of agricultural commodities where the commodities are likewise comprised of constituent components.

BRIEF DESCRIPTION OF DRAWINGS

For a better understanding of the present invention, reference may be made to the accompanying drawings, in which.

DESCRIPTION

Figure 1:
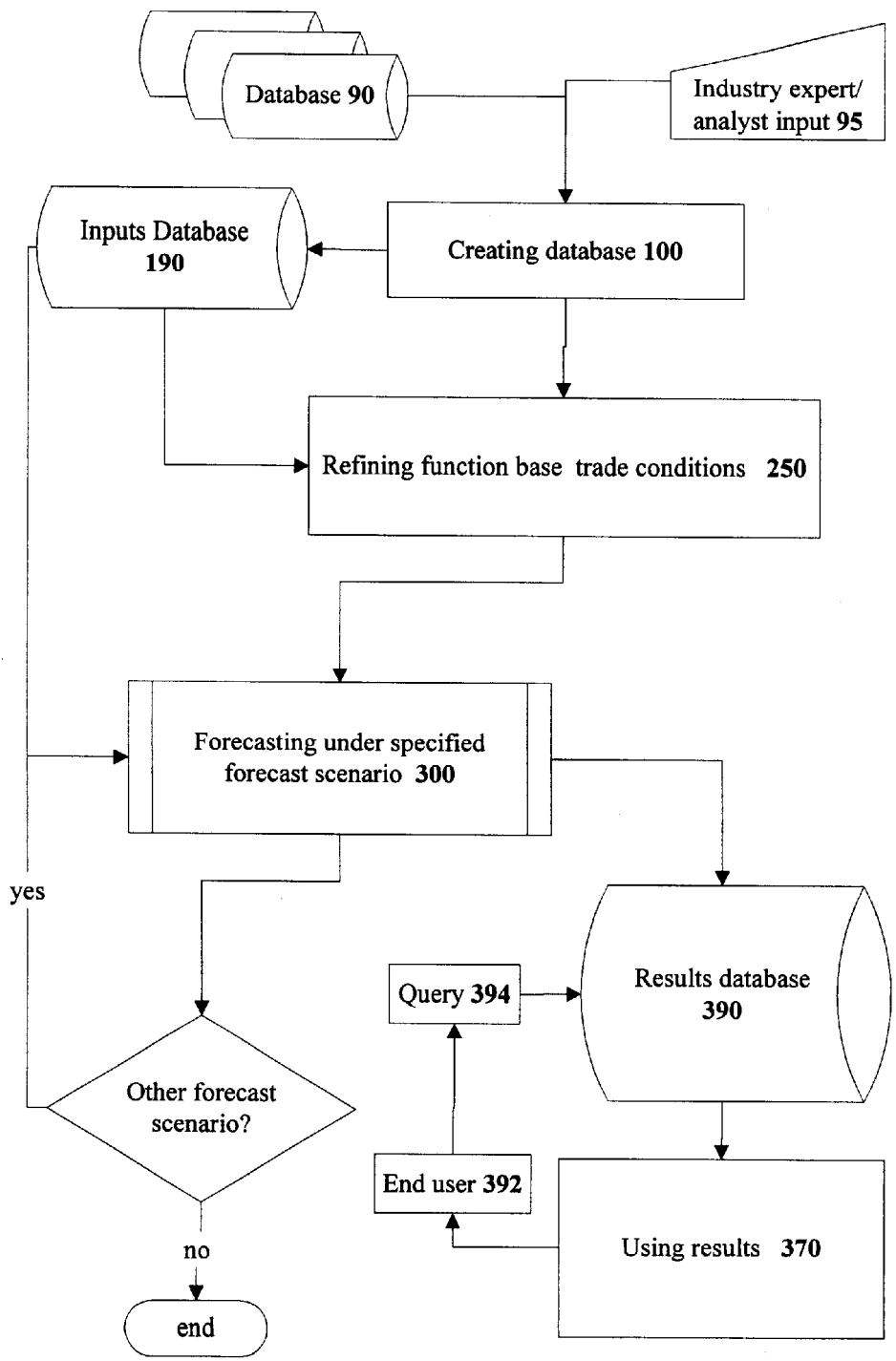
FIG. 1, shows a flow chart depicting a version of the methodology for forecasting attributes of agricultural commodities.

Referring now specifically to the figures, in which identical or similar parts are designated by the same reference numerals throughout, a detailed description of the present invention is given. It should be understood that the following detailed description relates to the best presently known embodiments of the invention. However, the present invention can assume numerous other embodiments, as will become apparent to those skilled in the art, without departing from the appended claims.

For example, the method and system of the present invention may be applied to analyze dairy markets at a variety of levels including global, regional and national levels, as described below. The method may, however, also be applied to several different agricultural sectors of commodities made from constituent components in addition to dairy, such as grains, meats, oil seeds and the like. Likewise, the solving for optimal utilization of intermediate commodities step may employ optimization subroutines developed for a variety of processing areas in addition to the cheese making process as described below, such as the process of making soft and frozen dairy products, breads from grain components, sausages from meat components or the like.

It should also be understood that, while the methods disclosed herein may be described and shown with reference to particular steps performed in a particular order, these steps may be combined, sub-divided, or re-ordered to form an equivalent method without departing from the teachings of the present invention. Accordingly, unless specifically indicated herein, the order and grouping of the steps is not a limitation of the present invention.

Overview

Referring to FIG. 1, the present invention comprises a method and system for accurately forecasting a price and other attributes such as production, consumption and trade flow levels of agricultural commodities comprised of constituent components over geographic regions, under various trade forecast scenarios and on at least an annual basis.

Figure 2:
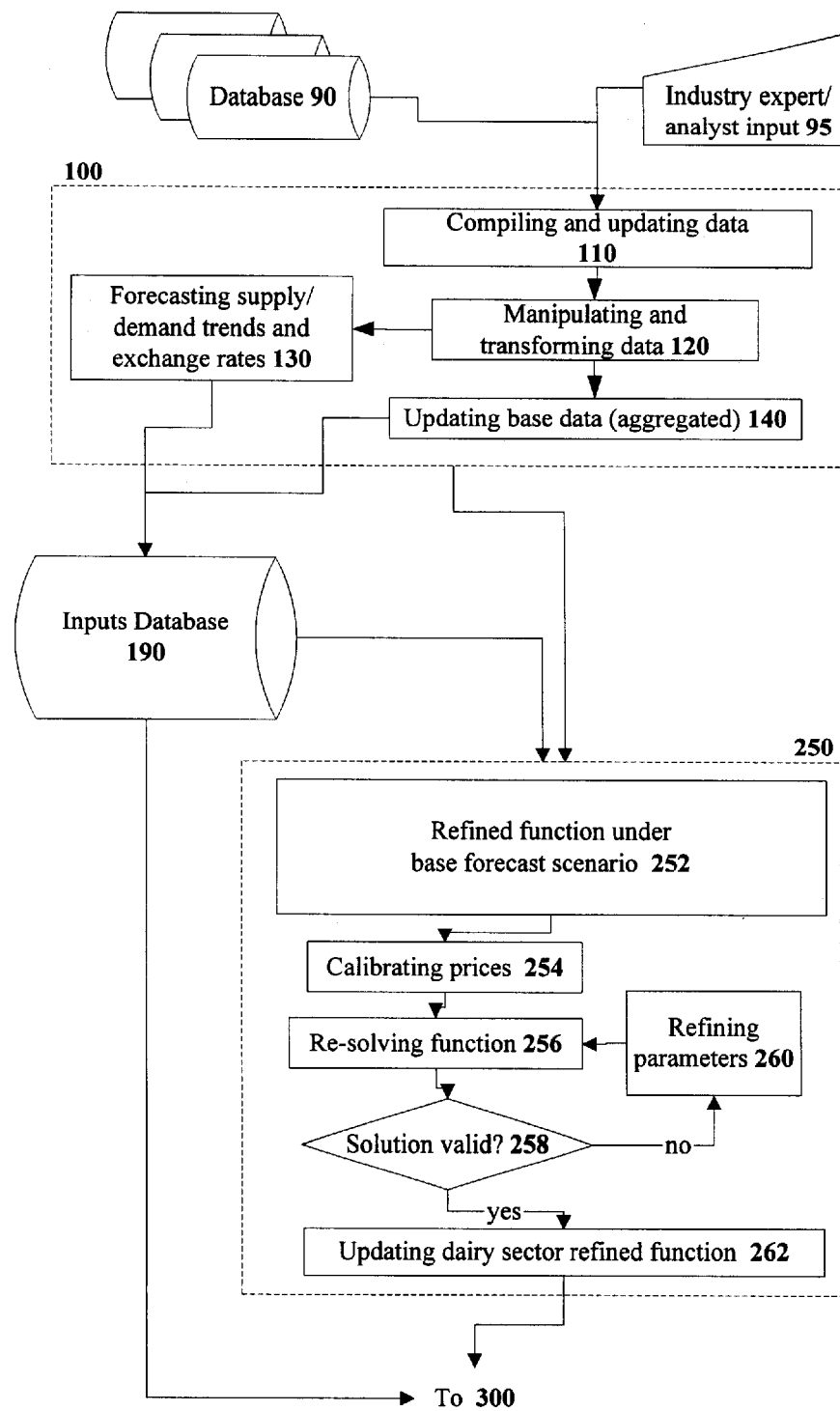
FIG. 2, shows the flow chart of FIG. 1 in part with the creating a database and refining the function steps expanded.

The method generally involves the steps of creating a database of agricultural sector data 100, approximating the market by a function that simulates the multi-component spatial equilibrium state of the agricultural market 200, refining the function with trade parameters set to current or recent trade conditions (base forecast scenario) 250, and forecasting the agricultural commodity prices and other attributes by running the function under a specified forecast scenario 300 (see FIG. 2 for an expansion of some of these steps).

The forecasting step 300 may be accomplished using a basic version of the function 210 or an intermediates version 220. The forecasting step 300 may optionally also comprise an optimization step 350 during which knowledge of how the intermediate components are optimally processed to make final reprocessed commodities may be used to further refine the forecasts (see FIG. 3).

Please note that the following detailed description applies the methodology of the present invention to the dairy sector, it may be applied to other agricultural commodities likewise comprised of constituent components.

Because many of the steps revolve around creating data for use by or defining the parameters of the function that approximates the multi-component spatial equilibrium state of a dairy market, the function is described first.

Detailed Description

1. Approximating an inter-regional multi-component market in agricultural primary, intermediate and processed commodities at a spatial equilibrium state. A function was developed to provide a means for accurately approximating the inter-regional multi-component spatial equilibrium state of the agricultural commodities market. The following description uses the dairy market by way of example.

The function comprises a multi-component (a.k.a. hedonic) spatial equilibrium model of the market of the dairy market with vertical linkages among production stages. The function provides a representation of a competitive market equilibrium both across commodities and over space (regions). It extends the Samuelson-Takayama-Judge (STJ) approach to spatial market equilibrium [see Samuelson, P. A., Spatial Price Equilibrium and Linear Programming, Amer. Econ. Rev 42 (June 1952): 283–303; Takayama, Y. and G. G. Judge, Spatial and Temporal Price and Allocation Models. Amsterdam: North Holland, 1971 at pp. 107–121, hereinafter incorporated by reference] by considering both trade and the transformation of primary (and intermediate) commodities into processed commodities. As such, the function is useful in the analysis of spatial resource allocation in a vertical marketing sector.

Figure 4A:
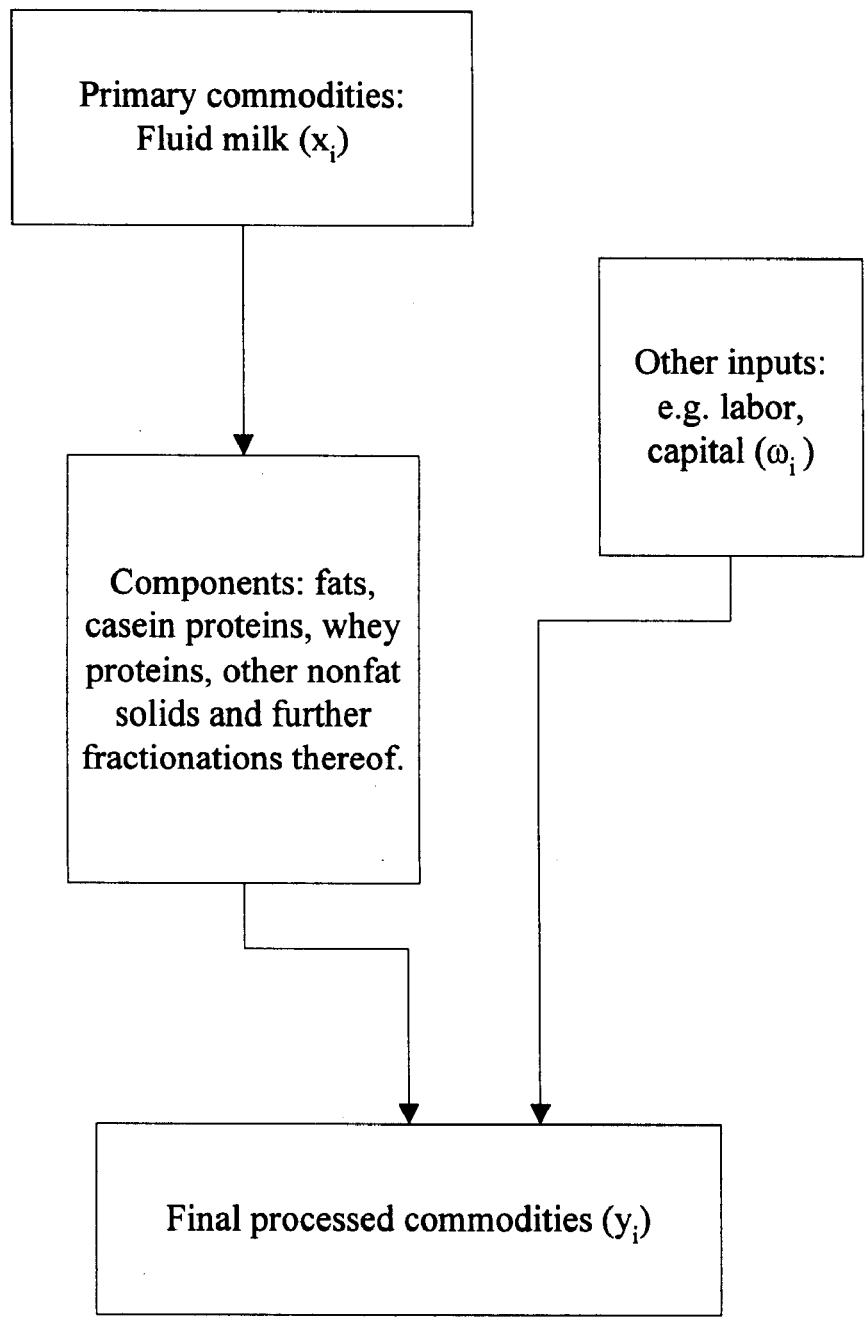
FIG. 4a, shows a general processing flow chart of dairy primary and processed commodities.
Figure 4B:
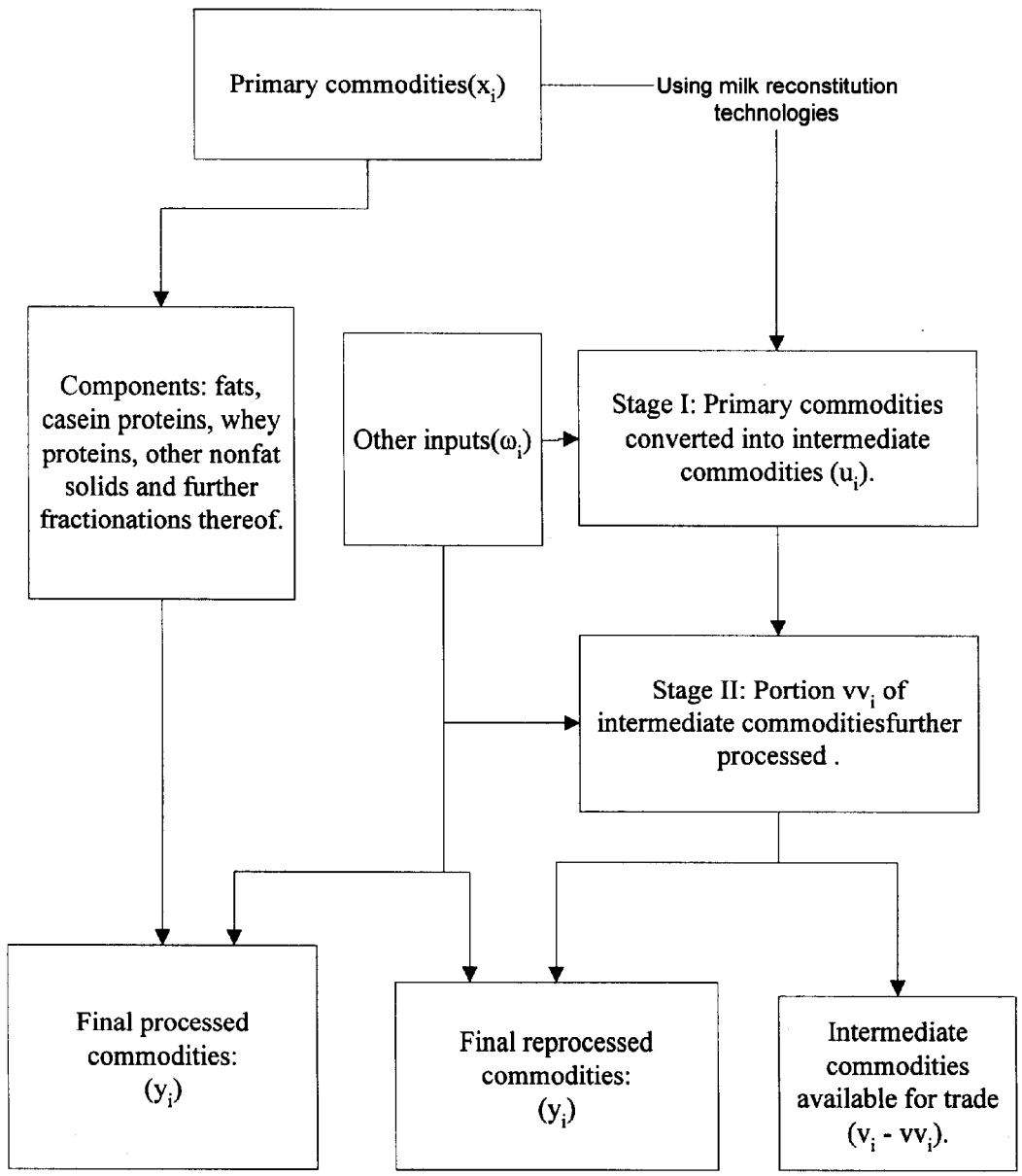
FIG. 4b, shows a general processing flow chart of dairy primary, intermediate and processed commodities, accounting for reconstitution technologies.
Figure 5A:
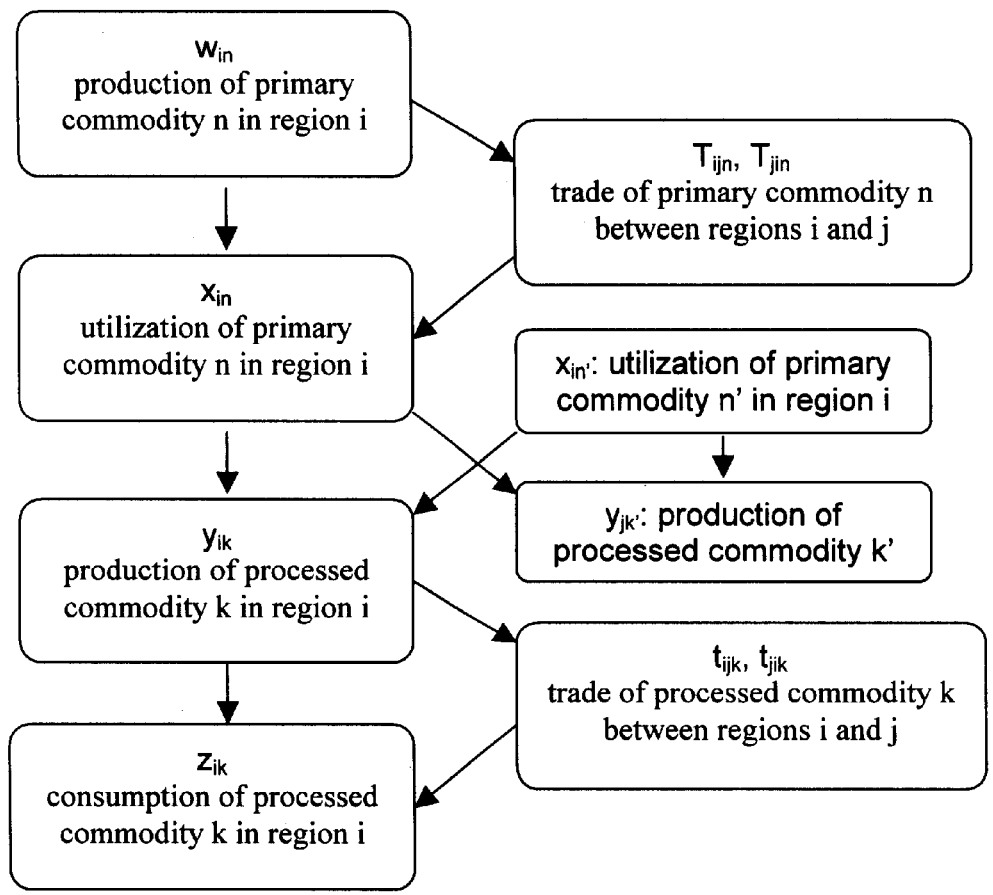
FIG. 5a, shows a flow diagram of the allocation process of primary and processed commodities among regions.

The equilibrium function in its basic version ("basic function" 210) accounts for trade in primary and processed dairy commodities across all regions and allows for the definition of forecast scenarios comprising trade and domestic policies (see sec. 1-a, FIGS. 4a and 5a). Building on the basic version of the equilibrium function, a further sophistication was added to specifically account for intermediate commodities as well (see sec. 1-b, FIGS. 4b and 5b). The resulting intermediates version of the function ("intermediates function" 220) thus enables greater accuracy in the forecasts because it accounts for the effects of reconstitution technologies on the dairy market.

1-a. The equilibrium function modeling the multi-component spatial equilibrium state of the market specifying primary and processed commodities, trade and domestic policies ("basic function" 210). The basic function 210 is given below in this section under "Basic function" 210.

The basic function 210 models competitive spatial resource allocation among I regions and considers vertical markets. Resources consist of primary commodities and processed commodities which can all be traded in markets assumed to be competitive. In the dairy market, primary commodities (farm milk from cow, buffalo, camel, sheep, goat) can be transformed into processed commodities (cheeses, butters, whole milk powders, skim milk powders, dry wheys, caseins, evaporated milks, condensed milks, and other dairy commodities) (see FIG. 4a). The linkages between primary and processed commodities are the milk components (milk fats, caseins, whey proteins, other non-fat solids and further fractionations thereof) that are "rearranged" by dairy processing plants. The primary commodities are not consumer goods, they are exclusively used as inputs in the production of the processed commodities that are consumer goods. Each region may be: 1) a producer of the primary commodities; 2) a producer of the processed commodities; 3) a consumer of the processed commodities; or some combination of the three possibilities (see FIG. 5a). Each region can trade both primary and processed commodities with any other region. The present equilibrium function is used to analyze the corresponding competitive spatial market equilibrium. The function represents a multi-component spatial market equilibrium model of resource allocation and trade over the I regions.

Development of the basic function 210. The following sections are included to explain how the basic function 210 was, developed and to explain how it works to model the multi-component spatial equilibrium state of the dairy market.

Consider a vertical sector involving primary commodities used in the production of processed commodities that are eventually consumed in the I regions. Each region is involved in the production, trade and consumption (utilization) of the primary as well as processed commodities (see FIG. 5a). Let $w_i(x_i)$ be the vector of primary commodities produced (consumed) in region i, i=1, ..., I. And let $y_i(z_i)$ the vector of processed commodities produced (consumed) in region i, i=1, ..., I. All the primary and processed commodities can be traded between regions. Denote by $T_{ij}(t_{ij})$ the vector of export of primary commodities from region i to region j. And let $C_{ij}(c_{ij})$ be the vector of transportation and marketing cost per unit of primary (processed) commodities traded from region i to region j.

Incorporating processing technology. Dairy manufacturing is a multi-output process with different products being produced jointly. It is assumed that there are two kinds of inputs used to produce the processed commodities y in each region: the vector of primary commodities x, and other inputs denoted by the vector $\omega_i$ (e.g., labor, capital). In the i-th region, the use of inputs $\omega_i$ must satisfy $(\omega_i, x_i, y_i) \in T_i$, where $T_i$ is the production possibility set. Efficient use of the inputs $\omega_i$ under perfect competition requires that they be chosen in a cost minimizing way:

$$G_i(x_i, y_i) = \min_{\omega_i} \{r_i' \omega_i : (\omega_i, x_i, y_i) \in T_i\}, \quad (1)$$

where $r_i$ is the vector of market prices for $y_i$ in the i-th region. $G_i(x_i, y_i)$ in (1) is a cost function measuring the cost of optimal use of inputs $\omega_i$, conditional on primary commodities inputs $x_i$ and output levels of processed commodities $y_i$.

In the context of the dairy sector, the primary commodities (multiple types of farm milk comprised of multiple milk components) can be transformed into multiple processed dairy products (cheeses, butters, whole milk powders, skim milk powders, dry wheys, caseins, evaporated/condensed milks, and other dairy products)(see FIG. 4a). The crucial linkages between primary and processed products are the milk components (milk fats, caseins, whey proteins, other non-fat solids and further fractionations thereof) that are "rearranged" by dairy processing plants. In each region, the total amount of components found in processed products must come from the primary products. To the extent that each product has fixed composition, this means that the processing technology can be represented by a Leontief technology with respect to milk components. Let $a_{is}$ ($b_{is}$) denote the matrix of quantities of the s-th component per unit of the primary (processed) commodities in the i-th region. And let matrix $A_i$ denote $[a_{i1}, \ldots, a_{iS}]$ and $B_i$ denote $[b_{i1}, \ldots, b_{iS}]$, where S is the number of components. Then the transformation relationship between primary and processed goods in region i must satisfy $$B_i' y_i \leq A_i' x_i, \quad i=1, \ldots, I, \quad (2)$$

This is a Lancasterian specification establishing fixed proportion relationships between commodities and their components, where the components are perfect substitutes across commodities. Under the Leontief specification, $G_i(x_i, y_i)$ can be written as $g_i(y_i)$ plus component balance restrictions (eq. (3)).

Considering the market equilibrium. In certain settings, market equilibrium is obtained through the maximization of a net social payoff function given by the sum of producer and consumer surplus across commodities as well as regions, net of transportation and processing costs. In a vertical sector involving more than one stage of production, the cost of transformation in each stage also needs to be subtracted. This gives the following quasi-welfare function $$V(w, x, y, z, T, t) = \Sigma_i CS_i(z_i) + \Sigma_i PS_i(w_i) - \Sigma_i g_i(y_i) - \Sigma_{ij} T_{ij} C_{ij} - \Sigma_{ij} t_{ij} c_{ij} \quad (3)$$

where $CS_i(z_i)$ is consumer surplus in region i, $PS_i(w_i)$ is producer surplus for the primary commodity $w_i$ in region i, $g_i(y_i)$ is transformation (processing) cost of final secondary products in region i.

Linking to market prices via the supply and demand curves. Assume that the quasi-welfare function $V(w, x, y; z, T, t)$ is concave and satisfies $\delta CS_i(z_i)/\delta z_i = p_i^c$ and $\delta PS_i(w_i)/\delta w_i = p_i^s$, where $p_i^s$ ($p_i^c$) is the vector of market prices for the primary (processed) commodities. This assumes that, under competition, market prices reflect marginal benefits for consumers and marginal costs for producers. In the presence of trade, the maximization of aggregate net social payoff is subject to two sets of constraints: the trade flow constraints and non-negativity constraints. For the i-th region, the trade flow constraints are $w_i \geq \Sigma_j T_{ij}$, (4a)

$\Sigma_j T_{ji} \geq x_i$, (4b)

$y_i \geq \Sigma_j t_{ij}$, (4c)

$\Sigma_j t_{ji} \geq z_i$. (4d)

These restrictions state that exports plus domestic uses cannot exceed domestic production, and that domestic consumption cannot exceed domestic production plus imports. This is true for primary commodities (eqs. (4a) and (4b)) as well as processed commodities (eqs. (4c) and (4d)).

The optimization problem representing spatial competitive equilibrium then is $\max_{w,x,y,z,T,t} \{\Sigma_i CS_i(z_i) + \Sigma_i PS_i(w_i) - \Sigma_i g_i(y_i) - \Sigma_{ij} T_{ij} C_{ij} - \Sigma_{ij} t_{ij} c_{ij}$:

subject to equations (3) and (5); (w, x, y, z, T, t) $\geq$ 0} (5)

In the absence of government intervention (i.e., no tax/subsidy and no quota distortions), the optimization problem (5) generates a Pareto efficient resource allocation. It also generates a competitive market equilibrium where the Lagrange multipliers associated with constraints (4) are interpreted as market prices.

Incorporating trade policies. The next step is to introduce policy parameters in the above model to reflect domestic and trade policies. The incorporation of trade policies into the function 210 involves accounting for specific duties (i.e., import tariffs and export subsidies) which is relatively straightforward in that they are equivalent to changes in transportation costs. However, the modeling of ad valorem tariffs is a little more complex. A simple way is to translate ad valorem tariffs into equivalent specific duties using observed prices. The drawback of this approach is that, in a market equilibrium framework, import tariffs influence market prices. This suggests a need to treat market prices as endogenous in the calculation of tariffs. This is done here by solving for market equilibrium iteratively, where each iteration uses updated specific duties equivalent of the ad valorem tariffs, until convergence is obtained. Upon convergence, the solution is identical to the one obtained from solving directly the associated mixed complementarity, problem. Finally, most non-tariff barriers influence import volume directly and can be introduced easily in spatial trade models by adding appropriate restrictions on quantities traded.

The tariff-rate quota policy is modeled by introducing two-tiered tariff restrictions. The basic idea is to divide imports of a commodity into two parts: one is imported at the in-quota (lower) tariff rate; and the other is imported at the over-quota (higher) tariff rate. The sum of these two parts is then available either as consumption or as inputs for further processing. Import quotas are always filled first at the lower in-quota rate before importing the commodity at higher over-quota tariff rates.

The restrictions on export subsidies are dealt with in a similar way. For each region (country or other region), subsidized exports of a particular commodity are subject to a quantitative restriction, i.e., the maximum allowable volume subject to subsidies under the GATT. A country's subsidized exports may also be subject to another constraint: the maximum allowable budgetary outlays that the country can spend on export subsidies for a commodity or a group of commodities. A country will always use up its export subsidy "quota" before exporting with no subsidy.

The following notation is used to incorporate these government trade policies into (5). Let $\Pi_{ij}(\pi_{ij})$ be the vector of unit-tariffs imposed on imports of primary (processed) commodities from region i to region j, and $\Delta_{ij}(\delta_{ij})$ be the vector of unit-subsidy towards exports of primary (processed) commodities from region i to region j. The vector of import quotas for the primary (processed) commodities in region i, i=1, . . . , I, is denoted by $Q_i$ ($q_i$). Finally, let $S_i(s_i)$ be the vector of maximum allowable volume of subsidized exports for the primary (processed) commodities in region i, i=1, . . . , I.

In the context of a two-tiered pricing scheme, let the superscript IQ denote in-quota, OQ denote over-quota import restrictions, and superscript s denote subsidized exports. Assuming that import quotas for each region are pooling quotas (i.e., not bilateral quotas), the distorted market equilibrium can be expressed as the basic function 210 given above.

Incorporating domestic policies. Domestic policies include governmental price support programs, production quotas and classified pricing. Price supports can be modeled by introducing a government sector (funded by tax-payers) with a perfectly elastic demand at the price support level. Milk production quotas are handily modeled by adding appropriate constraints to farm milk production and adjusting farm level milk prices (the marginal cost of production) as market milk prices minus milk quota rents. If over-quota taxes are not too prohibitive, then a two-tier pricing scheme is needed for modeling domestic production (i.e., using a within- and over-quota pricing scheme in a way similar to the two-tier pricing discussed above).

Classified pricing is modeled by introducing appropriate "price wedges" for the relevant products (e.g., fluid milk) [for disclosure of incorporation of price wedges into the function 210, see Thomas L. Cox and Jean Paul Chavas, An Interregional Analysis of Price Discrimination and Domestic Policy Reform in the U.S. Dairy Sector, 2001, 83(1) (February 2001): 89–106, the disclosure of which is incorporated herein by reference]. A value, $y_{ik}$ can be interpreted as the market price of $y_{ik}$ in region i. When $y_{ik}>0$, the price of commodity $y_{ik}$ in region i ($\lambda_{ik}$) equals its marginal cost ($\delta G_i/\delta y_{ik}$), plus the price wedge $R_{ik}$. The price wedge $R_{ik}$ generates a departure from marginal cost pricing for $y_{ik}$ in region i. A positive (negative) price wedge $R_{ik}$ contributes to an increase (decrease) in the price of commodity $y_{ik}$ in region i.

As a result, solving the equilibrium function 210 generates a distorted equilibrium under the price wedges Q and R. In principle, these price wedges are quite flexible and can be associated with a variety of price distortions both among commodities and across regions and between different levels in the marketing chain. For example, the existence of positive (negative) R price wedges could reflect processor (or retailer) market power in selling (buying). The Q price wedges could reflect the degree of market power of dairy farmers through cooperatives and/or the federal/state Milk Marketing Orders (MMOs). The absence or diminution of farm price wedges Q relative to the revenues generated by the R price wedges could then be interpreted as a relative lack of market power compared to up-market participants (processors and/or retailers) who keep the gains from price discrimination for themselves.

The basic function 210 thus may represent dairy markets under domestic and/or trade policies. The first line in function 210 is similar to (5), but is then expanded in the subsequent lines to include classical trade distortions (within and over quota tariffs, export subsidies, and production and import quotas) which reflect the price distortions and quantity restrictions generated by government policies, and to include price wedges to reflect domestic policies (see eq. 210 below). Given the particular forecast scenario defined, the parameters of the basic function 210 can be set to reflect only trade policies (as when the basic function 210 is used to model regions at in the world dairy sector), only domestic policies (as when the function 210 is used to model regions in a national dairy sector, such as that of the U.S. or Canada) or both (when the function 210 is used to model regions where both trade and domestic policies effect the dairy sector regionally, such as in the E.U.; the U.S. and Canada; the U.S., Canada and the E.U., and the like).

Solving the basic function comprises maximizing the consumer and producer surplus net of all transaction costs.

The "basic function" 210. The "basic function" 210 is given below including a definition of terms not previously defined.

$$\max_{w,x,y,z,T,t} \{ \Sigma_i CS_i(z_i) + \Sigma_i PS_i(w_i) - \Sigma_i g_i(y_i) - \Sigma_{i,j} T_{ij} C_{ij} -$$
$$\Sigma_{i,j} t_{ij} c_{ij} - \Sigma_{i,j} T_{ij}^{IQ} \Pi_{ij}^{IQ} - \Sigma_{i,j} (T_{ij} - T_{ij}^{IQ}) \Pi_{ij}^{OQ} - \Sigma_{i,j} t_{ij}^{IQ} \pi_{ij}^{IQ} -$$
$$\Sigma_{i,j} (t_{ij} - t_{ij}^{IQ}) \pi_{ij}^{OQ} + \Sigma_{i,j} T_{ij}^{S} \Delta_{ij} + \Sigma_{i,j} t_{ij}^{S} \delta_{ij} - \Sigma_{i,k} R_{ik} y_{ik} + \Sigma_{i,n} Q_{in} x_{in} :$$

subject to component balance, trade flow and non-negativity constraints:

$T_{ij}^{IQ} \leq T_{ij}$, $t_{ij}^{IQ} \leq t_{ij}$,
$\Sigma_{i \neq j} T_{ij}^{IQ} \leq Q_j$, $\Sigma_{i \neq j} t_{ij}^{IQ} \leq q_j$,
$\Sigma_{j \neq i} T_{ij}^{S} \leq S_i$, $\Sigma_{j \neq i} t_{ij}^{S} \leq s_i$,
$\Sigma_n Q_{in} x_{in} = \Sigma_k R_{ik} y_{ik}$
a plurality of component balance constraints, $$(w, x, y, z, T, t, T^{IQ}, t^{IQ}) \geq 0\} \quad (210)$$

where, $CS_i(z_i)$ is consumer surplus for processed commodity $z_i$ consumed in region i, i=1, . . . , I;

$PS_i(w_i)$ is producer surplus for primary commodity $w_i$ produced in region i, i=1, . . . , I;

$g_i$ is the vector of processing cost of transforming primary commodities $x_i$ into the amount of final processed commodities $y_i$ produced in region i, i=1, . . . , I;

$w_i(x_i)$ is the vector of primary commodities produced (consumed) in region i, i=1, . . . I;

$y_i(z_i)$ is the vector of processed commodities produced (consumed) in region i, i=1, . . . , I;

$T_{ij}(t_{ij})$ is the vector of export/import of primary (processed) commodities from region i to region j;

$C_{ij}(c_{ij})$ is the vector of transportation and marketing cost per unit of primary (processed) commodities traded from region i to region j;

$S_i(s_i)$ is the vector of maximum allowable volume of subsidized exports for the primary (processed) commodities in region i, i=1, . . . , I;

$\Pi_{ij}^{IQ}(\pi_{ij}^{IQ})$ is the vector of in-quota unit tariff rates on primary (processed) commodities imported from region i to regions j;

$\Pi_{ij}^{OQ}(\pi_{ij}^{OQ})$ is the vector of over-quota unit tariff rates on primary (processed) commodities imported from region i to region j;

$T_{ij}^{IQ}(t_{ij}^{IQ})$ is the vector of primary (processed) commodities imported from regions i to region j at the in-quota rate;

$\Delta_{ij}(\delta_{ij})$ is the vector of subsidy rates on exports of primary (processed) commodities from region i to region j;

$T_{ij}^{S}(t_{ij}^{S})$ is the vector of exports of primary (processed) commodities from region i to region j at the subsidy rate;

$R_{ik}$ is a price wedge for processed commodity $Y_{ik}$ over all regions i and over all kth processed commodities; and, $Q_{in}$ is a price wedge for primary commodity $x_{in}$, over all regions i and over all nth primary commodities.

1-b. The equilibrium function modeling the multi-component spatial equilibrium state of the market specifying primary, intermediate and processed commodities, trade and domestic policies (intermediate commodities version, "intermediates function" 220). The intermediates function 220 is a version of the basic function 210 in which intermediate commodities have been incorporated. The intermediates function 220 is given in below in this section under "Intermediates Function" 220, with modified and new notation defined (see sec. above on basic function 210 for definition of terms common to both).

Figure 5B:
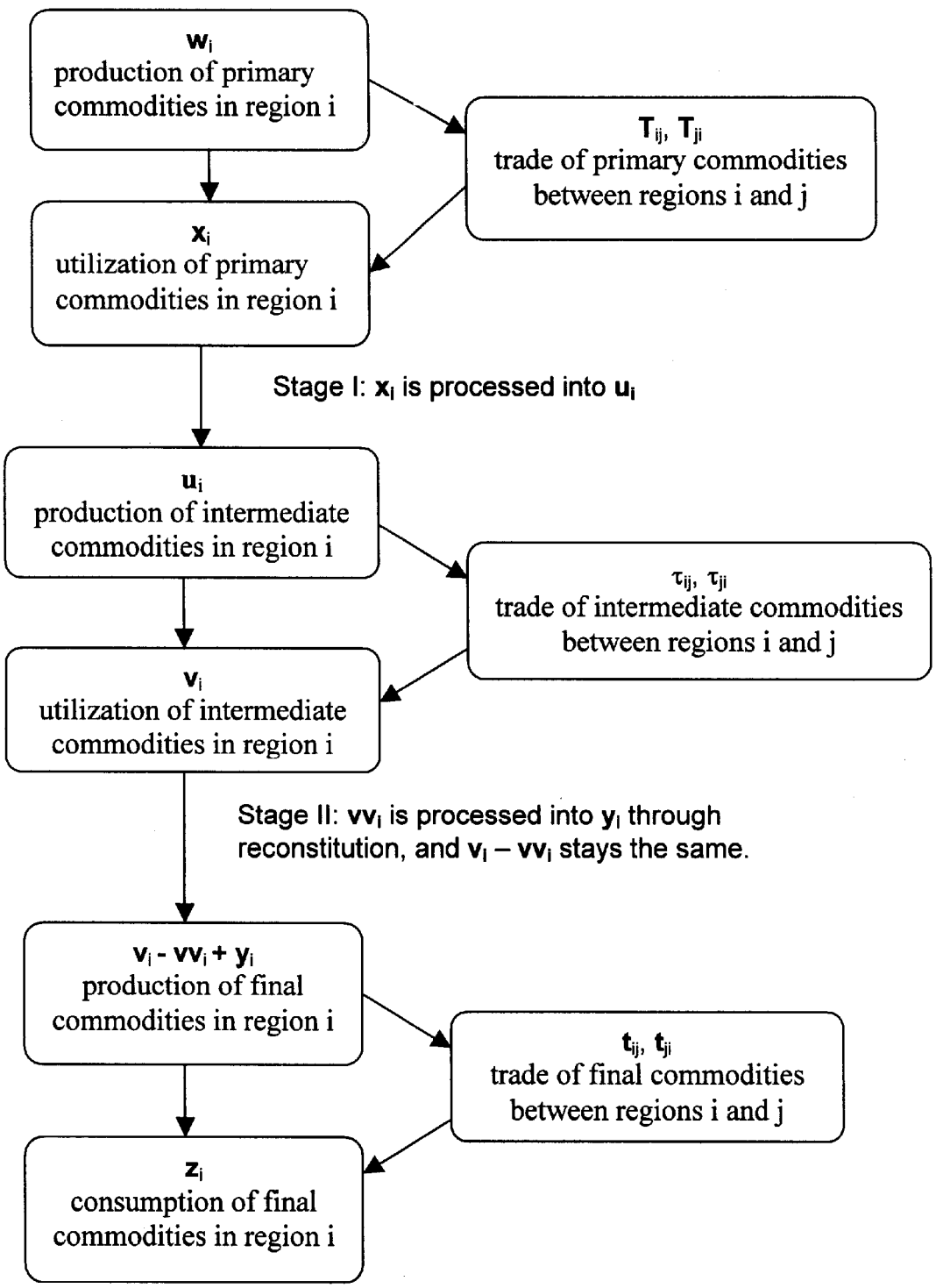
FIG. 5b, shows a flow diagram of the allocation process of primary, intermediate and processed commodities among regions.

Milk, or other commodity, reconstitution technology may be reflected in the basic function 210 with the inclusion of intermediate commodities as per the intermediates function 220 (see also FIGS. 4b and 5b). The intermediates function 220 enables the forecasting of the prices and other attributes of those intermediate commodities and, thereby, more accurate forecasting of the prices and other attributes of the dairy commodities.

Several categories of commodities can be used as intermediate dairy processing commodities (e.g., butters/butter oils, skim milk powders, whole milk powders, condensed and evaporated milks, caseins, dry wheys, milk protein concentrates and other commodities embodying fractionated milk components) that may be used in the production of other dairy commodities. For example, cream may be considered an intermediate commodity as it can be further processed into butter, butter oil, ice cream, buttermilk and many other dairy commodities. In the dairy processing practice of milk reconstitution, milk powders, milk fat commodities, and other dairy commodities are converted back into fluid milk for consumption or are used for making other dairy commodities.

Reconstitution technology is reflected in the intermediates function 220, by assuming there are two stages in the processing sector. First, the primary commodities are converted into intermediate commodities (such as butters, butter oils, skim milk powders, whole milk powders, condensed and evaporated milks, caseins, dry wheys, milk protein concentrates, cream and other products embodying fractionated milk components), that may be used in the production of other dairy products. At the second stage, some of the intermediate commodities are further processed into final reprocessed commodities. The remaining intermediate commodities and the reprocessed commodities compose the final consumption commodities such as butter oil, ice cream, buttermilk, fluid milk (made from the milk reconstitution process using milk powders, milk fat products or other dairy products), cheeses and other processed commodities (see FIG. 4b). Trade is possible following the first stage of processing.

Incorporating intermediate commodities into the function. Suppose a technology allows L types of intermediate commodities to be reprocessed into M types of final reprocessed commodities, which is a subset of final commodities. Let $u_i$ be the vector of intermediate commodities produced in the $i^{th}$ region and $v_i$ be the vector of intermediate commodities available (i.e. produced in region i plus imported into region i) in the $i^{th}$ region following the trade. A portion of $v_i$, $vv_i$ is the vector of intermediate commodities reprocessed into final commodities in the $i^{th}$ region, and vector $y_i$ is the output of the reprocessing procedure. Let $G_i(x_i, u_i)$ be the cost (i.e., costs of other inputs except for dairy material inputs) of transforming the $x_i$ of primary commodities into $u_i$ of intermediate commodities. Under the Leontief specification, $G_i(x_i, u_i)$ can be written as $g_i(u_i)$ plus component balance restrictions. In a similar fashion, let $H_i(vv_i, y_i)$ be the transformation costs converting $vv_i$ of intermediate commodities into $y_i$ of final commodities, which can be written as $h_i(y_i)$ plus component balance restrictions. Let $\tau_{ij}$ be the shipment of intermediate commodities from the $i^{th}$ region to the $j^{th}$ region. Furthermore, let $E_i$ be the matrix representing the nutrient composition of reconstituted commodities and $F_i$ be the matrix representing the nutrient composition of intermediate commodities.

The basic function 210 with an intermediate commodity reprocessing stage is characterized by the intermediates function 220 assuming that reprocessed commodities share the same trade policies as other commodities. The intermediates function 220 extends the optimization problem of the basic function 210 by incorporating: 1) the cost of processing intermediate commodities into final commodities ($h_i(y_i)$); 2) the shipments of intermediate commodities ($T_{ij}$) under in-quota quota ($\pi_{ij}^{IQ}$) and over quota ($\pi_{ij}^{OQ}$) tariffs and export subsidies ($\delta_{ij}$); 3) an expanded component balance incorporating the conversion of intermediate commodities into final commodities ($E_i' y_i \leq F_i' vv_i$, noting that $B_i' u_i \leq A_i' x_i$, is equivalent to (2)); and 4) expanding the trade balance ($v_i - vv_i + y_i \geq \Sigma_j t_{ij}, \Sigma_j t_{ji} \geq z_i$), import quota ($\Sigma_{1 \neq j}(t_{ij}^{IQ} + \tau_{ij}^{IQ}) \leq q_j$), export subsidy ($\Sigma_{j \neq i}(t_{ij}^{s} + \tau ij^{s}) \leq S_i$) and non-negativity ((w, x, u, v, vv, y, z, T, t, $\tau$, $T^{IQ}$, $t^{IQ}$, $\tau^{IQ}$)$\geq$0) constraints of (5) to include the intermediate and reconstituted final commodities ($v_i, vv_i, y_i$) and trade flows ($\tau_{ij}$).

The multi-component spatial equilibrium state of the dairy sector may be approximated by either the basic function 210 or the intermediate function 220 depending on the needs of the user. Employing the intermediates function 220 may give more accurate predictions because of its reflection of reconstitution technologies by incorporation of intermediate commodities.

"Intermediates function" 220. The intermediates function 220 is given below, along with definitions of terms.

$$\max_{w,x,y,z,T,t} \{\Sigma_i CS_i(z_i) +$$

$$\Sigma_i PS_i(w_i) - \Sigma_i g_i$$

$$(u_i) - \Sigma_i h_i(y_i) -$$

$$\Sigma_{ij} T_{ij} C_{ij} - \Sigma_{ij}$$

$$(t_{ij} + \tau_{ij}) c_{ij}$$

$$-\Sigma_{ij} T_{ij}^{IQ} \Pi_{ij}^{IQ}$$

$$-\Sigma_{ij}(T_{ij} - T_{ij}^{IQ})\Pi_{ij}^{OQ}$$

$$+\Sigma_{ij} T_{ij}^{s} \Delta_{ij} - \Sigma_{ij}$$

$$(t_{ij}^{IQ} + \tau_{ij}^{IQ})\pi_{ij}^{IQ}$$

$$-\Sigma_{ij}(t_{ij} + \tau_{ij} - t_{ij}^{IQ}$$

$$-\tau_{ij}^{IQ})\pi_{ij}^{OQ} + \Sigma_{ij}$$

$$(t_{ij}^{s} + \tau_{ij}^{s})\delta_{ij}$$

$$-\Sigma_{i,k} R_{ik} y_{ik}$$

$$+\Sigma_{i,n} Q_{in} x_{in}:$$

subject to component balance, trade flow and non-negativity constraints:

$$w_i \geq \Sigma_j T_{ij}, \Sigma_j T_{ji} \geq x_i$$
$$u_i \geq \Sigma_j \Sigma_{ij}, \Sigma_j \tau_{ij} \geq v_i$$
$$v_i - vv_i + y_i \geq \Sigma_j t_{ij}, \tau_j t_{ji} \geq z_i$$
$$T_{ij}^{IQ} \leq T_{ij}, t_{ij}^{IQ} \leq t_{ij}, \tau_{ij}^{IQ} \leq \tau_{ij},$$
$$\Sigma_{i \neq j} T_{ij}^{IQ} \leq Q_j, \Sigma_{i \neq j}(t_{ij}^{IQ} + \tau_{ij}^{IQ}) \leq q_j,$$
$$\Sigma_{j \neq i} T_{ij}^{s} \leq S_i, \Sigma_{j \neq i}(t_{ij}^{s} + \tau_{ij}^{s}) \leq s_i,$$
$$\Sigma_n Q_{in} x_{in} = \Sigma_k R_{ik} y_{ik}$$

a plurality of component balance constraints, and $$(w, x, u, v \geq vv, y, z, T, t, \tau, T^{IQ}, t^{IQ}, \tau^{IQ}) \geq 0\} \quad (220)$$

where, $CS_i(z_i)$ is $CS_i(z_i)$ is the vector of consumer surplus for processed commodity $z_i$ consumed in region i, i=1, . . . , I;

$PS_i(w_i)$ is the vector of producer surplus for primary commodity $w_i$ produced in region i, i=1, . . . , I;

$w_i(x_i)$ is the vector of primary commodities produced (consumed) in region i, i=1, . . . , I;

$y_i(z_i)$ is the vector of processed commodities produced (consumed) in region i, i=1, . . . , I;

$g_i$ is the vector of processing cost of transforming primary commodities x into the amount of intermediate commodities $u_i$ produced in region i, i=1, . . . , I;

$h_i$ is the vector of processing cost of transforming intermediate commodities $vv_i$ into final commodities $y_i$ in region i, i=1, . . . , I;

$T_{ij}(t_{ij})(\tau_{ij})$ is the vector of export/import of primary (processed) (intermediate) commodities from region i to region j;

$C_{ij}(c_{ij})$ is the vector of transportation and marketing cost per unit of primary (processed and intermediate) commodities traded from region i to region j;

$S_i(s_i)$ is $S_i(s_i)$ is the vector of maximum allowable volume of subsidized exports for the primary (processed) commodities in region i, i=1, . . . , I;

$\Pi_{ij}^{IQ}(\pi_{ij}^{IQ})$ is the vector of in-quota unit tariff rates on primary (processed and intermediate) commodities imported from region i to regions j;

$\Pi_{ij}^{OQ}(\pi_{ij}^{OQ})$ is the vector of over-quota unit tariff rates on primary (processed and intermediate) commodities imported from region i to region j;

$T_{ij}^{IQ}(t_{ij}^{IQ})(\tau_{ij}^{IQ})$ is the vector of primary (processed) (intermediate) commodities imported from regions i to region j at the in-quota rate;

$\Delta_{ij}(\delta_{ij})$ is the vector of subsidy rates on exports of primary (processed and intermediate) commodities from region i to region j;

$T_{ij}^{s}(t_{ij}^{s})(\tau_{ij}^{s})$ is the vector of exports of primary (processed) (intermediate) commodities from region i to region j at the subsidy rate;

$R_{ik}$ is a price wedge for processed and intermediate commodity $y_{ik}$ over all regions i and over all kth processed commodities; and, $Q_{in}$ is a price wedge for primary commodity $x_{in}$ over all regions i and over all nth primary commodities.

2. Creating an inputs database of dairy sector data 100. Generally, a tremendous amount of data is required to operationalize the multi-component spatial equilibrium function (210 or 220). As a result, a step in the methodology is compiling and conditioning a preliminary set of data (for a number of recent years) for use as the input to the equilibrium function (210 or 220). This is done by (a) compiling and updating a database of dairy sector data from various sources 110, (b) manipulating and transforming the data to produce files of the data in a form usable by the equilibrium function (210 or 220), 120, (c) forecasting updated supply and demand trends and exchange rates data 130, and (d) updating the base forecast scenario files of aggregated data 130, to create the inputs database 190 (see FIG. 2, where step 100 is expanded).

2-a. Compiling and updating a preliminary database of dairy sector data 110. Much of the information on the dairy commodity attributes of production, consumption and trade that is needed to perform the method of the present invention is available in raw form from public and/or private source databases 90. Also needed is a definition of the regions over which trade in the commodities is to be analyzed and a definition of the forecast scenarios (base and others). These definitions are input by industry experts or analysts 95. These external data are then pre-processed and manipulated to produce a database of dairy sector data 190.

2-a-(1). Inputs of data. The data required as input are provided by industry experts or analysts 95 and public and/or private databases of dairy sector data 90.

2-a-(1)(a). Input by industry experts or analysts 95. Industry experts, analysts or other users may define the regions over which trade in the commodities is to be analyzed. They may also define the base and other forecast scenario parameters for analysis.

Defining the regions. As discussed in sec. 1, the equilibrium functions 210 and 220 solve for an equilibrium state of the market over I regions (i=1 . . . I). A user of the methodology of the present invention may define what those regions are to be, given their particular interests. Data in regard to the dairy commodities can then be organized by those regions when input to the equilibrium function (210 or 220).

Example—world dairy sector. For example, the regions may comprise several countries each and span the globe in order to simulate and analyze the regional market equilibrium impacts of trade policies in the world dairy sector. This was done and disclosed in U.S. patent application Ser. No. 09/775,946 filed 2001 Feb. 2, entitled "Method for Forecasting the Effects of Trade Policies and Supply and Demand Conditions on the World Dairy Sector," by inventors Thomas L. Cox, Jean-Paul Chavas and Yong Zhu, the disclosure of which is incorporated herein by reference. In this example, the regions i were determined to include the U.S., Canada, Mexico, China, India, Japan, Australia, New Zealand, western Europe, eastern Europe and the former Soviet Union (FSU).

Example—U.S. dairy sector. As an example of defining regions within a single nation, the U.S. dairy sector may be analyzed (see Thomas L. Cox and Jean Paul Chavas, An Interregional Analysis of Price Discrimination and Domestic Policy Reform in the U.S. Dairy Sector, 2001, 83(1) (February 2001): 89–106, at p. 96, the disclosure of which is incorporated herein by reference). In this example, the regions i were determined to include 12 regions: Northeast, Appalachia, Florida, Southeast, Mideast, Upper-Midwest, Central, Southwest, Western, Northwest, Arizona and California.

Likewise, the regions may be defined by other countries (e.g. Canada, Japan, etc.) or regions (e.g. European Union (E.U.); U.S. and Canada; U.S., Canada and E.U., etc.) according to the needs of the user.

Defining an at least one forecast scenario. If changes to current trade policies are under consideration, one or more alternative forecast scenarios may be defined. In defining a forecast scenario, the trade parameters of the equilibrium function (210 or 220) may be changed accordingly. As was described under the approximating the equilibrium function step 200 above, various trade and domestic policy parameters are incorporated into the function. Trade policy parameters include tariff (in-quota, over-quota) rates on imports of commodities and subsidies on exports. Domestic policy parameters include price wedges to reflect price discrimination or other domestic policies.

Examples of several alternative forecast scenarios are disclosed for the world dairy sector in U.S. patent application Ser. No. 09/775,946 filed 2001 Feb. 2, entitled "Method for Forecasting the Effects of Trade Policies and Supply and Demand Conditions on the World Dairy Sector," by inventors Thomas L. Cox, Jean-Paul Chavas and Yong Zhu, the disclosure of which is incorporated herein by reference. Various forecast scenarios are also defined for the U.S. dairy sector in Thomas L. Cox and Jean Paul Chavas, 2001 (An Interregional Analysis of Price Discrimination and Domestic Policy Reform in the U.S. Dairy Sector, 83(1)(February 2001): 89–106, the disclosure of which is incorporated herein by reference).

2-a-(1)(b). Inputs from public and/or private source databases 90. Data are also gathered from sources that may include public and/or private databases of dairy sector data by regions as defined above. Some of the main data inputs used to operate the equilibrium function (210 or 220) under a base and other forecast scenarios may include (a) base year(s) farm level prices and production of primary commodities, wholesale level prices, production, and consumption of secondary dairy commodities; (b) a regional wholesale sector value-added matrix (farm wholesale processing and distribution costs); (c) interregional transportation costs; (d) regional supply and demand elasticities; (e) regional income elasticities; (f) Gross Domestic Product (GDP) growth rates; and (g) regional trade distortions. These data inputs are in some cases available as is, and in others must be derived or calculated separately. These data may be retrieved from a variety of source databases 90 that provide the data in a form downloadable over the Internet or otherwise available to a user.

Examples of sources of dairy sector data for the world dairy sector might include publicly available sources like the Food and Agriculture Organization of the United Nations (FAO), the International Monetary Fund (IMF), the Organization for Economic Cooperation and Development (OECD) or private sources. Data on the U.S. dairy sector may be obtained from the U.S. Department of Agriculture (USDA) and/or other sources including private sources.

2-a-(2). Pre-processing of the raw data. Once the raw data is gathered from the various sources and stored electronically, it must be "cleaned" or otherwise pre-processed (e.g., the labels of the data set are changed to conform to the corresponding data labels in the relational database, e.g. MS-Access) and resaved in a form importable into the Access database.

The data is then organized into raw data tables and grouping tables. Raw data tables are tables that include one or more fields that can be mathematically manipulated. Raw data tables are used to store disaggregate raw data, e.g., by region (as defined above) and commodity. Raw data tables may include those for production (milk and commodity), composition (milk and component), import quantity, import value, export quantity, export value, price, stock, exchange rate (in the case of multi-currency regions), GDP growth and the like.

By contrast, grouping tables store information to define aggregation and sorting criteria for a specific field. Grouping tables may include region, commodity category, region order, category order and the like. By changing the information in these tables, users may easily regroup or sort data in alternative formats according to their needs, making the data retrieval very flexible.

Commodity categories may likewise vary with the particular application; For example, categories may include milk (that may include milk of cows, buffalos, goats, sheep, and camels); cheese (that may include all types of cheese and curd including fresh cheeses, such as cottage cheese); butter (that may include all milk fat commodities, consisting of butter, ghee, and butter oil); whole milk, skim milk and buttermilk powders; dry wheys, caseins and caseinates; condensed and evaporated milks; and dairy not included in the previous categories such as fluid milk, soft, and frozen commodities (see. FIGS. 4a and 4b generally for additional categories).

2-a-(3) The preliminary database. In summary, the preliminary database (updated with new data as and when it becomes available) contains demand and supply data for dairy commodities organized by regions. For production data, the database may contain annual production data (generally recorded in metric tons) for the selected commodities. Trade data in the database generally include those for all commodities and for consistency are generally given in metric tons for quantities and 1,000 US dollars for costs.

Price data in the database may be included for certain of the commodities and recorded in local currency units per metric ton (if regions span different currencies). The database 190 also may include official exchange rate data that are used to convert price data from local currencies into U.S. dollars.

The preliminary database also may contain stock data that are generally available in aggregated form. For example, rather than data for different types of cheese, only ending stock data for cheese as a whole may be available. There are generally five commodity categories having stock data: cheese, butter, whole milk powder, skim milk powder, and casein. If only annual stock change data rather than ending stocks are available for a region, it is converted into ending stock by arbitrarily adding starting stock data for the first year. Since in the majority of studies only stock changes are of interest, this "conversion" should not affect data accuracy.

To estimate the trends in demand and supply changes the database also may include real GDP growth rate data. Real GDP growth includes both the population growth and GDP per capita change, and is adjusted for inflation.

Trade policy and milk component data are generally not stored in Access because they are in rather aggregated forms and involve many calculations. These data may be stored in a variety of Excel (or other spreadsheet) files instead.

2-b. Manipulating and transforming the data in the preliminary database to produce updated files in a ormat usable by the equilibrium function, 120. The data in the compiled preliminary database is further processed to provide information in a form appropriate for use in the equilibrium function (210 or 220). To achieve this end, the data are further manipulated and transformed 120 as described below.

For example, in Example 2 below, in which the equilibrium function 210 is applied to the world dairy sector, country level data are required and need tremendous manipulation and processing to obtain regional level computer input data (regions being defined as groups of countries). The compiled database tables are queried to retrieve information of whatever sort is needed by the equilibrium function (210 or 220), and/or further calculations are made to derive new information from the data. In this way, regional level data and other calculated data are prepared for input to the equilibrium function (210 or 220) run under current or recent trade conditions (the base forecast scenario).

Queries may be constructed to retrieve information for regional milk production, milk price and milk composition, for example. Standardization and/or reconstitution parameters may also be derived. For example, the degree of intermediate dairy commodities (skim and whole milk powder, evaporated/condensed milks, dry whey protein concentrates, butter/anhydrous milk fat) and usage to make the final demand dairy commodities (cheese and residual category commodities such as fluid milk, frozen and soft commodities) may be calculated by region. Any number of additional queries are possible limited only by the imagination and requirements of the user. The results of the queries may also be exported in spreadsheet format, if desired.

Various calculations are also performed to determine other values stored in the database for use by the equilibrium function (210 or 220). For example, consumption is generally computed from a supply and demand balance worksheet where consumption is taken as the residual of, Production+Imports−Exports+Beginning Stocks−Ending Stocks (=Consumption; if stocks data are missing, they are omitted in this computation). Another calculation is performed to increase the accuracy of FAO data on production and prices, if FAO data is used. A three-year average may be calculated for any given year's data (e.g. 1999–2001 data averaged to give year 2000 value). In this way the more recent year data of the older database are updated using current year data. Interregional transportation costs (TC) are calculated as flat transportation costs [e.g., for non-refrigerated commodities (whole and skim milk powder, casein, evaporated and condensed milk and dry whey), TC=$0.018/MT/Nautical mile; for refrigerated commodities (cheese and butter), TC=$0.027/MT/Nautical mile; and a very high rate is used for fresh milk commodities (to characterize partially high trade barriers on fresh milk commodities)]. As well, commercial sources can be used to obtain more detailed and country-to-country specific transportation costs. Distance data may be derived from Defense Mapping Agency data or other sources.

2-c. Forecasting updated supply/demand trends and exchange rates 130. Naïve supply and demand trends are updated by choosing compound growth rates (by commodity and by region) to minimize forecast error over the 5 years prior to and including the current base forecast scenario year data ("base data"). Annual quantity forecasts are generated from base data using compound growth rates for each commodity and region. Prices are adjusted to quantity forecasts by subtracting price changes/demand (supply) elasticity from the forecast demand (supply) changes. The GDP and population projections are used with income elasticities to forecast demand for commodity/region.

The equilibrium function (210 or 220) is run under the base forecast scenario to generate linear regional supply and demand curves using regional supply and demand elasticities (e.g., that may be derived from USDA SWOPSIM data; see, Roningen, V., J. Sullivan, and P. Dixit, 1991, Documentation of the Static World Policy Simulation (SWOPSIM) Modeling Framework, Staff Report No. AGES 9151, Washington, D.C.: USDA/ERS) and base level prices and quantities. Regional income elasticity data may be derived from USDA SWOPSIM or other sources data for major countries when the world dairy sector is being considered, and may be computed for other countries assuming that countries having similar development status have similar demand characteristics.

2-d. Updating the base forecast scenario aggregated data files 140. Newly retrieved, manipulated and in some cases updated data (as described above) are merged with current base forecast scenario data files to update them in a final database of dairy sector data 190. Once this is done, the equilibrium function (210 or 220) itself can be updated as per below (refining the model step 250).

The result of these steps in creating a database 100, is to transform the files of dairy sector information stored in the inputs database 190 to accurately reflect the current economic trade conditions and to be usable by the equilibrium function (210 or 220). In this way, the equilibrium function (210 or 220) run under the base forecast scenario, is specified to provide an accurate representation of the dairy market(s) and reflects recent trade conditions in the regions as specified.

2-e. The inputs database of agricultural sector data 190. The resulting inputs database of dairy (or other agricultural) sector data 190 includes data for use in the refining the function 250 and forecasting 300 steps of the method. The inputs database 190 provides data for use in solving the equilibrium function (210 or 220) in the forecasting step 300 that generally comprise: a) farm milk prices, production, use, consumption data; b) aggregate commodity supply/demand trend and price data; c) commodity production by region; d) commodity consumption by region; e) domestic and trade policy assumptions; f) transportation distances and costs; and, g) supply and demand elasticities by region.

3. Refining the equilibrium function with trade scenario parameters set to current trade conditions (base forecast scenario) 250. During this step 250, the base forecast scenario data are adjusted to be consistent with equilibrium function (210 or 220) specifications before the function is used to do other analyses. Generally this entails (a) running the function (210 or 220) under a current or recent trade scenario (base forecast scenario) using the transformed data prepared in the creating the database step 100 described previously to generate preliminary dairy sector attribute forecasts 252, (b) calibrating price data 254, (c) re-solving the equilibrium function (210 or 220) using the calibrated price data (and updated ad-valorem tariff rates or other data, if applicable) 256, and, (d) validating the model's results by comparison to actual data from the dairy sector 258. Depending on the results of the validation step 258, parameters of the model are refined accordingly 260. This process is iterative and results in a refined equilibrium function (210 or 220) able to predict dairy sector attributes accurately.

3-a. Generating preliminary agricultural sector attribuyte forecasts 252. The equilibrium function (210 or 220) is run under the base forecast scenario to generate a preliminary set of dairy (or other agricultural) sector forecasts.

3-b. Calibrating price data 254. Price calibrations are performed in order to address certain limitations of the data. For example, FAO provides price data only for primary commodities (raw milk prices). The secondary dairy commodity price data is obtained from several other sources that may, unfortunately, only provide information for major dairy countries and major dairy commodities. Moreover, very limited information is available on dairy manufacturing and distribution costs generally. Estimates are made of the manufacturing and distribution costs for major dairy commodities (cheddar cheese, butter, skim milk powder, and whole milk powder) by region. To handle these data limitations, the equilibrium function (210 or 220) is used to compute unknown manufacturing and other cost parameters while solving for the optimal base forecast scenario solution.

The basic idea of this price calibration procedure is to search for the values for those unknowns that are consistent with the equilibrium function (210 or 220) specifications, equilibrium conditions and the parameters based on data that are available. This involves solving the equilibrium function (210 or 220) a number of times with the calibrated data updated in each run. The procedure can be divided into the following steps. Step one: "guess" the values of the unknown manufacturing and other cost parameters as the starting values and solve the model. Step two: compare the equilibrium function (210 or 220) solutions with the data, which include the original "guessed" data. Adjust those "guessed" data/parameters in the direction that will potentially reduce the deviation of equilibrium function (210 or 220) solutions from the data, and solve the function again. Step three: repeat step two until no further significant changes are needed to alter the function solution.

The goal of calibration via updating manufacturing costs is to replicate the data for regional milk price and production data by choosing region-specific adjustments on processing costs. Using the procedure described above we obtain region-specific price calibration wedges that make the regional milk prices in the equilibrium function (210 or 220) solution the same as (or sufficiently close to) the observed price data.

Given that the milk supply curves are fixed, calibrating the milk price in this manner is equivalent to calibrating regional milk production because the calibration procedure is to move the equilibrium points along the fixed supply curves. As for the calibration of regional prices of secondary commodities, the position of the associated regional demand curves is adjusted to the points that are relatively consistent with milk supply curves and other demand curves, on which good information is available. Using the procedure described above, the unknown prices, and thus regional consumption, can be calibrated. The regional demand curves are then reset with the updated prices by re-computing prices intercepts and slopes under standard formulas using assumed demand elasticities, base forecast scenario quantity and calibrated price data. After sufficient iteration of the calibration process, base data is replaced with the current equilibrium function (210 or 220) solutions for prices.

Market prices are treated as endogenous in the calculation of tariffs. This is done by solving for market equilibrium iteratively, where each iteration uses updated specific duties equivalent of the ad valorem tariffs, until convergence is obtained. Upon convergence, the solution is identical to the one obtained from solving directly the associated mixed complementarity problem. Finally, most non-tariffs barriers influence import volume directly and can be introduced easily in spatial trade models by adding appropriate restrictions on quantities traded.

3-c. Re-solving the equilibrium function 256. The equilibrium function (210 or 220) is re-solved using the calibrated price data (and updated ad-valorem tariff rates or other data, if applicable).

3-d. Determining if he model's solution is valid 258. After the equilibrium function (210 or 220) is re-solved 256, the results are compared to actual data to determine if its solution is valid 258. The actual data used are averages over several recent years under the current base forecast scenario.

As an example of the validation procedure, consider the following. The base forecast scenario is run to forecast annually to 2000 using only information available in 1995. Naïve supply/demand shifters based on 1989–1994 data and annual exchange rate forecasts are employed. The resulting annual forecasts are then compared with actual annual data from 1996, 1997, 1998, and 1999 for farm prices, milk and commodity production, trade, etc. The accuracy of the equilibrium function (210 or 220) can then be assessed and the function's assumptions (e.g., supply/demand trends)

refined accordingly. The focus is on near-term assumptions as these will affect the accuracy of the shorter-term forecasts.

3-e. Refining parameters of the model 260. If the solution is found to be not valid, parameters of the equilibrium function (210 or 220) are refined 260, and the function re-solved again. This process is continued until the equilibrium function (210 or 220) results are deemed valid, at which point the function is considered to be sufficiently calibrated.

Some of the equilibrium function (210 or 220) parameters refined by this process include (a) domestic (regional) policy parameters (e.g. intervention prices, production/consumption subsidies, quota rents, fluid/manufacturing milk price wedges), (b) trade policy parameters [e.g. GATT commitments for world dairy sector version (import quotas, two-tiered import tariffs (within and over quota), export subsidies (quantity and expenditure)], and (c) standardization/reconstitution parameters [e.g., the degree of intermediate dairy commodities usage (skim and whole milk powder, evaporated/condensed milks, dry whey protein concentrates, butter/anhydrous milk fat) to make final demand dairy commodities (e.g., cheese and residual category (fluid milk, frozen and soft commodities) by region].

The equilibrium function (210 or 220) is run again (as in step 256) with the refined parameters and the validation step 258 repeated until the function's solutions conform acceptably to the actual data. When this occurs, the equilibrium function (210 or 220) is deemed to be refined sufficiently for its forecasts to be accurate.

3-f. Updating base equilibrium function 262. Once the equilibrium function (210 or 220) is validated, its parameters are updated to reflect those values that resulted in valid forecasting by the function. The refined equilibrium function (210 or 220) is now ready for use in forecasting.

Figure 3:
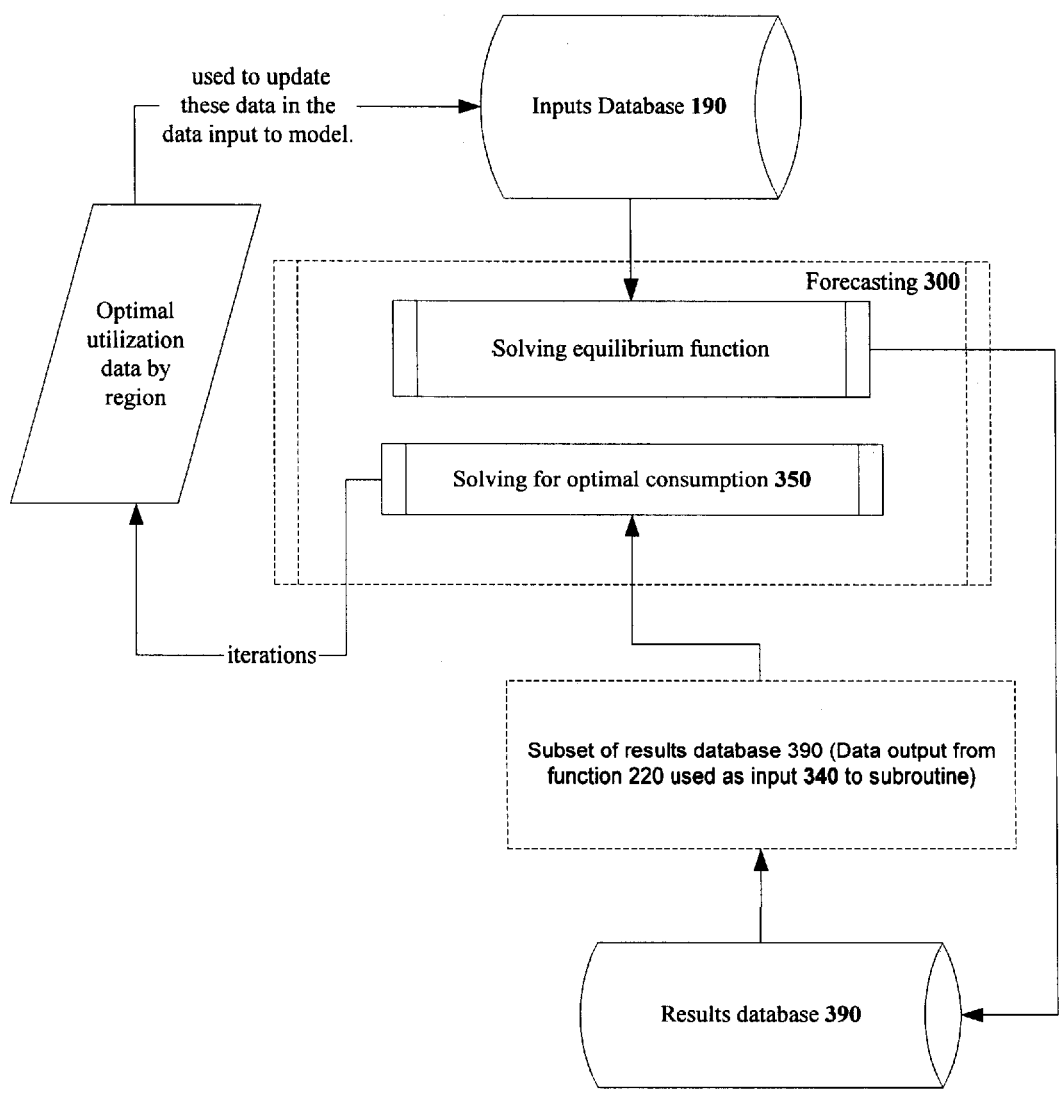
FIG. 3, shows a flow chart detailing the forecasting step with inclusion of an optimization step.

4. Forecasting commodity prices and other attributes by running refined equilibrium function under specified forecast scenario 300. Referring to FIGS. 1 and 3, the refined equilibrium function (210 or 220) that results from the above step 250, is now ready for use in accurately forecasting commodity and component prices on an at least annualized basis under the current base forecast scenario and optionally also, other forecast scenarios 300. The equilibrium function (210 or 220) is generally run to forecast out 5 years annually (or semi-annually), updating the next year forecast with the current equilibrium function (210 or 220) solution and updated supply/demand shifts and policy parameters (see, e.g., Table 1 below as an example of a 5-year forecast of whole milk powder prices in a portion of the world dairy sector). Thus the equilibrium function (210 or 220) may produce variable number of years worth of annual (or semi-annual) forecasts that can be updated periodically as new data are acquired. These forecast data are stored in a results database 390. The forecast results 390 may include (1) regional/aggregate milk production, price, and interregional exports/imports; (2) regional/aggregate commodity production, consumption, price, and interregional exports/imports; (3) regional/aggregate milk component prices; (4) regional/aggregate pricing parameters, reference prices, etc.; (5) regional/aggregate welfare summary measures: producer and consumer revenues and surplus measure, cost to taxpayers, etc.

TABLE 1

December 2000 Forecast Format: 1998 and 1999 Validations, 2000–2003 Forecasts.
Whole Milk Powder Price Projection (US$/MT)

|  | 1998 | 1998 OECD/ FAO | % ERR | 1999 | 1999 OECD/ FAO | % ERR | 2000 | 2001 | 2002 | 2003 |
|---|---|---|---|---|---|---|---|---|---|---|
| W. Europe | 2,852 | 2,902 | −1.7 | 2,974 | 2,861 | 4.0 | 2,925 | 2,779 | 2,796 | 2,766 |
| E. Europe | 1,832 | 1,851 | −1.0 | 1,834 | 1,913 | −4.1 | 1,910 | 1,930 | 2,007 | 2,027 |
| E. Asia | 2,412 | 2,417 | −0.2 | 2,412 | 2,567 | −6.0 | 2,517 | 2,608 | 2,633 | 2,652 |

Under base forecast scenario. Running the refined equilibrium function (210 or 220) under the base forecast scenario yields forecasted optimal regional values for dairy commodity prices, production and consumption levels, trade flows, and implicit component prices (e.g., fat, casein, whey protein, lactose and other components). The base set of annualized forecasts may include farm level prices and production; commodity prices, production and consumption by commodity and region; imports and exports by commodity and by region; commodity trade flows by commodity and by region; and producer and consumer surplus (welfare), net costs to treasury (tariff revenues minus export subsidy and intervention price expenditures), and effects of price wedges on market prices or the like.

Under alternative forecast scenario(s). If changes to current trade or domestic policies are under consideration, the forecast scenario parameters of equilibrium function (210 or 220) may be changed to reflect another forecast scenario (as defined above), the function re-run under the new forecast scenario and results compared to those for the base forecast scenario to determine how the price and other attributes of dairy commodities and their constituent components will vary under the alternative trade scenario. Knowledge of how the dairy sector will react to changes in trade policies enables dairy industry management to inform decisions regarding how to plan for those changes and minimize risk to their industry.

The equilibrium function (210 or 220) may be run under any number of forecast scenarios according to the needs of the user. Solving the equilibrium function (210 or 220; FIG. 3) generally involves continued iterations until first order conditions are met.

The resulting database 390 of forecasted values under specified forecast scenarios may then be used in industry management to inform decisions regarding dairy commodity procurement strategies, investments in the regional markets, the management of stocks of commodities, futures contracting, and the like. The results database 390 may be queried by a user to provide specified presentations of the results and/or further analyses 370. For example, results may be used in management and procurement decisions. They may be queried to create versions of the results data customized to the needs of the user.

5. Solving for optimal consumption of intermediate commodities 350. The methodology of the present invention may optionally further include a step in which an optimal amount of intermediate commodities consumed to make one or more of the processed commodities is calculated 350 (see FIG. 3). The optimal mixture of intermediate commodities consumed in the making of a processed commodity is one that minimizes the cost of making a processed commodity given the local availability and pricing of intermediate commodities for use in this process.

As advances in reconstitution technology are made and as policies governing what intermediate commodities are allowed to be used in the making of a processed commodity are modified, the ability to optimize a mixture of those intermediates becomes increasingly important. As a result, there are available various optimization subroutines routinely employed to direct a maker of processed commodities what to use in the intermediates mixture.

Step 350 employs these already existing optimization subroutines in a new way by incorporating them into the spatial equilibrium state approximated by the intermediates version of the function 220. Doing so enables the further refinement of forecasts of price and other attributes of dairy commodities by working in concert with the intermediates function 220. Essentially, this step solves for the mixture of intermediate commodities that would have been used to make a forecasted amount of a processed commodity made in a given region i (an amount forecasted in the prior step of forecasting by solving the intermediates function 220), if the processed commodities were made in an optimal cost-minimizing way. Several optimization subroutines are currently available that enable this calculation for certain kinds of processed commodities (e.g., cheeses, soft and frozen commodities).

Referring to FIG. 3, the amounts of intermediate commodities and components consumed in the "optimal" making of the forecasted amount of processed commodities are calculated by running the optimization subroutine 350. These new optimal amounts of intermediate commodities and components consumed in regions i, can then be used to modify the data input to the intermediates function 220 and the function re-run. Several iterations of solving the function 220 and optimization subroutine 350 may occur until the difference in forecasts between iterations approaches 0.

Example—optimizing the making of cheese. Though the example given applies to the production of cheese, other optimization subroutines may be employed that are applicable to various other types of processed commodities and may also be employed in the present methodology.

Figure 6:
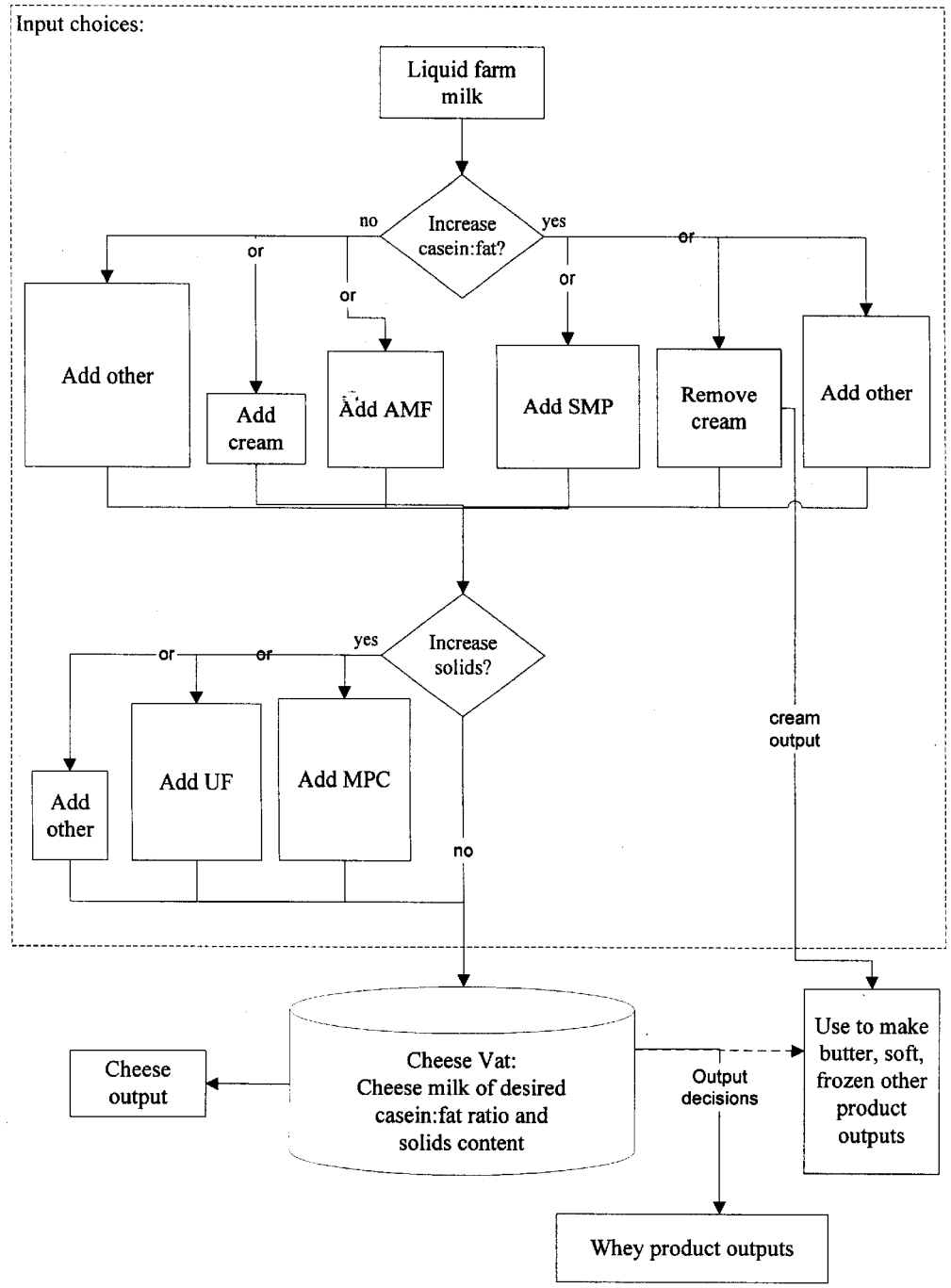
FIG. 6, shows a flow chart of decisions representative of those typically made by a cheese maker to optimize a casein to fat ratio in a cheese vat mixture.

In cheese making, which components a cheese maker chooses to use to make a particular cheese will depend on their allowability, price and affects on yield of cheese produced (see FIG. 6 for overview of component choices in cheese making where AMF is anhydrous milk fat; SMP is skim milk powder; UF is liquid ultra-filtered milk protein concentrates). Currently, the components a cheese maker is allowed to use as standardizing agents in the production of cheese is strictly regulated. For example, current standards of identity forbid the use of the dry form of milk protein concentrates (MPC) in most cheese making processes. As cheese making technology and regulations evolve; milk protein concentrates may be increasingly used as a standardizing agent in the cheese making process with important implications to yield of cheese produced. How is a cheese maker to evaluate the over all yield and cost implications of his choice of standardizing agents? In today's rapidly evolving market, decisions based simply on the cheapest standardizing agents are no longer sufficient. Nor do they allow a cheese maker to plan for the future given likely changes to policy and its inevitable affects on the yields from and costs of making cheese.

Though already existing optimization subroutines may obtain ordinary input of standardizing agent prices, using them in conjunction with the multi-component spatial equilibrium intermediates function 220 may expand the potential of the present methodology to even more accurately forecast attributes of dairy commodities. The optional optimization step 350 allows an optimization subroutine to utilize the component price forecasts from the solving of function 220, and generate values for the optimal amounts of intermediates and components consumed in the making of the amount of cheese produced. Iterating these the solving of function 220 and running of the optimization subroutine 350 as described above, results in the further refinement of the forecasts generated. It may also further enable a cheese maker to see the longer term implications to his industry of the price forecasts under varying trade forecast scenarios, and to manage his business to maximize profits and to minimize market risks in the near in longer term.

A cheese making optimization subroutine is included here by way of example. The optimization subroutine shown below includes the cheese-specific variable cost associated with processing a pound of cheese milk, unlike the cheese maker's ordinary objective function. This enables a cheese maker to capture the gains from a higher yield. The objective function of the optimization subroutine is:

$$\text{MAX}_x \sum_{l=1}^{L} p_c x_{lc} + \sum_{l=1}^{L} \sum_{m=1}^{M} p_m x_{lm} - \sum_{l=1}^{L} \sum_{n=1}^{N} c_n x_{ln} - \sum_{l=1}^{L} \sum_{n=1}^{N} v_l x_{ln}$$

where, $x_{1n}$: milk or standardizing agent n used in production of cheese 1;

$x_{1c}$: cream removed in production of cheese 1;

$x_{1m}$: whey products m produced from whey stream of cheese 1;

$p_m$: sale price of whey product m;

$P_c$: sale price of skimmed cream;

$C_n$: cost of milk or standardizing agent n; and, $v_1$: processing cost per pound of cheese milk for cheese 1.

Here $v_1$ is interpreted as a cheese-specific variable cost associated with processing a pound of cheese milk. Without this cost, the cheese maker simply makes his cheese from the cheapest components available, without considering the yield implications. This cost was incorporated into the objective function in order to capture the gains from a higher yield to the cheese maker. The cheese making process takes place in a vat (or vats) of fixed capacity, and increasing the yield means the same amount of cheese can be produced from less cheese milk, requiring less use of the vat or producing more cheese from the same vat constraints. Since the output level $q_1$ is fixed, reducing the amount in cost of inputs used to make that output increases the yield and/or decreases the cost.

Cheese-milk constraints include a constraint on the lactose level in the vat, the amount of solids in the vat, constraints on the fat and casein levels in the vat, and a vat capacity constraint. The amount of solids is the second crucial constraint in understanding the cheese making process (see mass balance constraints. The amount of fat and casein levels in the vat are the only constraints in this problem because the cheese production is fixed. Ordinarily, these levels are implicitly chosen by the cheese maker when he decides how much cheese to make. Since the amount of cheese to make is already determined in the model, the fat and casein levels become equality constraints. It is in satisfying these two constraints that the cheese maker produces the desired amounts of cheese. The production constraints force the optimization model to conform to observed industry-wide utilization levels of intermediate commodities or standardizing agents for the years analyzed. Production levels enter the model as maximums for milk, standardizing agents, and cream. The representative profit-maximizing cheese maker cannot use more milk than is produced for the dairy industry in a given year, for instance, but he is not forced to use all the milk if he can do it with less or by substituting standardizing agents within legal and technical processing constraints. Whey-stream production levels are the minimum amounts of these commodities that the cheese maker must produce. Since these only come from the cheese making process, the cheese maker must have at least enough components in the whey to satisfy the production of these commodities. The mass balance constraints ensure that there are enough components in the system to produce all of the outputs. Furthermore, they are the only restrictions on whey-stream utilization. Whey commodities are "produced" by subtracting them from the components in the whey stream.

From the above, it can be seen that several data outputs from the forecasting step 300 in which the equilibrium function 220 is solved, are used as data inputs 340 to the cheese optimization subroutine (see FIG. 3). These include, for example, 1) the amount of each product that can be made with reconstituted intermediate dairy inputs produced in each region; 2) the availability of intermediate dairy products that can be used as standardizing agents (additional ingredients) in making each type of cheese in each region— a) quantity and price are solved for by the function 220 and b) intermediate dairy input composition is assumed via a standard of identity; and, 3) from 1), the amount of each component required to produce the amount of each product that can be made with reconstituted intermediate dairy inputs produced in each region.

The cheese optimization subroutine uses these inputs 340 to generate outputs 360 of optimal intermediate commodity and component utilization (consumption) data by region. These outputs 360 are then used to update same in the inputs to the forecasting step 300, and the forecasting 300 and optimizing 350 steps iterated until the differences between consecutive forecasts approach 0. Similarly, other optimization subroutines may be employed at step 350 as a further means of refining the forecasted results.

Figure 7:
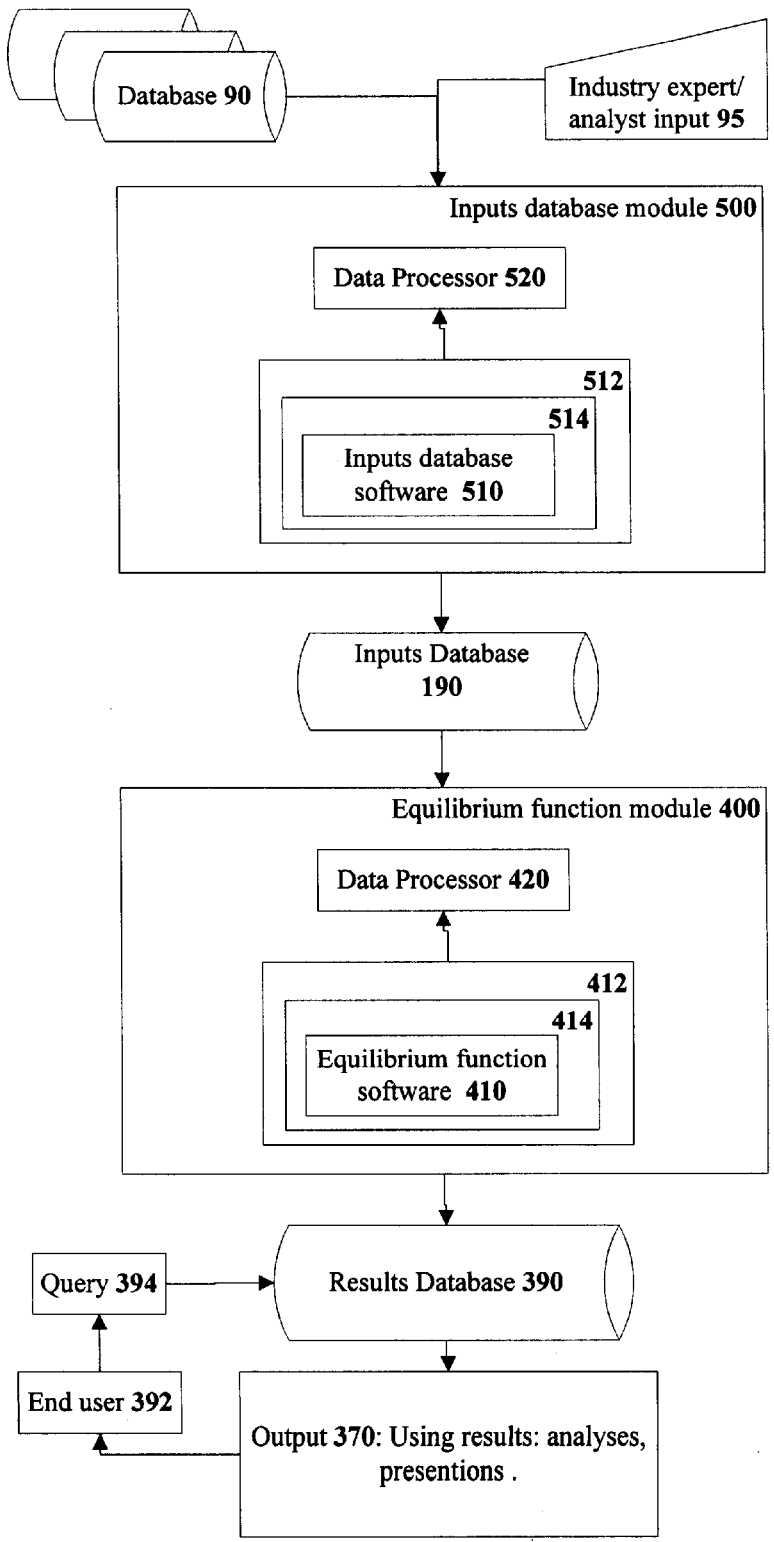
FIG. 7, shows the general system of the present invention.

6. Using the forecast results. Once the forecasts are stored in the results database 390, they may be used in deciding how to optimally allocate industrial or technological resources employed in the production, consumption or trading of the commodities. The results database 390 may be queried by an end user 392 who can request specific information from the system through the query 394 and thereby produce customized output 370 (FIGS. 1 and 7). A user may create queries to customize output 370 according to the user's particular needs. For example, output may be directed to only certain types of commodities in certain regions. Or the results may be presented in a variety of formats useful to the user such as graphs, spreadsheets, maps, HTML documents, or other formats. Because of the regional geographic nature of the output, it may be suited to a geographic presentation using mapping software. Any number of queries 394 may be formulated to fulfill a user's needs for forecasts of a certain type or in a certain form for using to make management and/or procurement decisions. The output 370 is furthermore storable in other databases or deliverable through a variety of channels, including facsimile, e-mail, local area networks (LANs), wide area networks (WANs) and the worldwide web. It can also, of course, be provided in hard copy.

How the invention may be applied

Example 1

Method for Accurately Forecasting Prices of Dairy Commodities and Components Thereof in U.S. Under Trade Scenario of Price Discrimination An application of the method and system of the present invention as applied to the U.S. dairy sector was disclosed in Thomas L. Cox and Jean Paul Chavas, 2001 (An Interregional Analysis of Price Discrimination and Domestic Policy Reform in the U.S. Dairy Sector, 2001, 83(1) (February 2001): 89–106) the disclosure of which is incorporated herein by reference. A brief summary of the methodology and results follows.

The U.S. dairy sector has experienced several reforms in both government price support and classified pricing under state and federal MMOs. Solving the equilibrium function 210 provided quantitative measures of the aggregate and regional impacts of alternative domestic deregulation forecast scenarios on dairy commodity prices, production, consumption and interregional trade flows in the U.S. The equilibrium function 210 was adapted to the U.S. dairy sector and used to simulate the allocation of farm milk used in the production of nine dairy commodities in a way consistent with milk component balances for milk fat, protein, and carbohydrate both within and across regions (see determining the regions section above for listing of U.S. regions used). The resulting function reflected the effect of a price discrimination forecast scenario on the market. Since no tariffs or subsidies were relevant to the analysis, those parameters were zeroed out in defining the base forecast scenario, leaving only the domestic policy of price wedges in the function 210 (see domestic policy section above).

Under price discrimination in the U.S., the minimum price of milk utilized in different classes of commodities is constant in each region, but set at a level that may differ from the competitive outcome. In this context, charging a higher price in the more inelastic markets tends to generate increased revenue. MMOs charge a higher price for fluid milk (that has a more inelastic demand) compared to manufactured milk (that has a less inelastic demand). This price discrimination is administered at the farm-wholesale level and enforced through the price processors pay for milk, based on utilization. Given the existence of many different dairy commodities, there are many possibilities to price discriminate. Spatial variations in both supply and demand for dairy commodities may affect the regional implementation of classified pricing as well as the regional distribution of its benefits.

The following methodological approach was implemented relying on an iterative solution to refine the function 210. In step one, consider a classified pricing scheme represented by the price wedges $R_{ik}$ that increase the prices of commodity k in region i. In step two, obtain some preliminary guess about the associated price wedges $Q_{in}$. In step three, solve the function 210 given $R_{ik}$ and $Q_{in}$. In step four, check whether the solution satisfies the constraint that $\Sigma_n Q_{in} x_{in} = \Sigma_k R_{ik} y_{ik}$ (see eq. 210, constraints). If it does not, use a Gauss-Seidel procedure to obtain a new guess of the $Q_{in}$ that would move in the direction of satisfying the constraint, and repeat from step three. If it does satisfy the constraint, the solution to function 210 represents the distorted market equilibrium under classified pricing. Upon convergence, this provides a formal framework to analyze the spatial implications of price discrimination for prices and resource allocation. This approach was used in an empirical investigation of MMOs.

The above refined equilibrium function 210 was applied to the U.S. dairy industry, with farm milk as the (only) primary commodity, and nine processed commodities: (1) fluid milk, (2) soft dairy commodities, (3) American cheese, (4) Italian cheese, (5) other cheese, (6) butter, (7) frozen dairy commodities, (8) other manufactured dairy commodities, and (9) nonfat dry milk. In addition to net private stocks, net government stocks/removals, U.S. imports, and U.S. exports, the U.S. is divided into 12 production/consumption regions (as listed under the determining the regions 90 step description above). In each region, farm milk can be transformed into dairy commodities in a way consistent with milk component allocation. Three milk components are analyzed: milk fat, protein, and carbohydrate (mostly lactose). The transformation technology is assumed to be a Leontief technology, where each commodity has a fixed component composition. The feasibility of component allocation across dairy commodities is imposed explicitly. The marginal effect of this restriction (given by the corresponding Lagrange multiplier) measures the shadow value of each component in each region. This has two attractive features. First, this generates empirical estimates of regional shadow prices for each component (milk fat, protein and carbohydrate). Second, for each commodity in each region, the equilibrium function 210 gives market prices that are consistent with component pricing.

The equilibrium function 210 solves for regional farm level prices and regional milk production as well as regional wholesale level price, supply, demand and trade flows for the nine dairy commodities. Most production and price data were obtained from USDA sources. In addition, regional projections of wholesale dairy commodity demand were obtained using aggregate U.S. wholesale demand functions and regional population data. Component yields (i.e., the amount of milk fat, protein and carbohydrates per unit of milk and wholesale dairy commodity) were obtained from a component accounting exercise that fully allocates 1995 aggregate milk and dairy commodities production. With the inclusion of 1995 exports and net government stocks/removals, the equilibrium function 210 starts from a farm, wholesale and component supply/demand balance that characterized the U.S. dairy sector in 1995. Both 1995 exports and government stocks/removals of butter, nonfat dry milk and American cheese are removed from the domestic market at 1995 price support levels (in the base forecast scenario) or sold at world market prices (all other forecast scenarios). All other imports/exports are held exogenous at 1995 levels.

The function 210 was further modified to take into account specific characteristics of the dairy industry (see Cox and Chavas, 2001, ref. above).

Results suggest current policies induce substantive aggregate and regional distortions in dairy commodity prices (and production, consumption) relative to an unregulated policy context. For example, a sample of commodity prices and their variation under the different forecast scenarios is presented in Table 2 below. A sample of regional variations in consumer and producer surplus amounts under the different forecast scenarios are presented in Table 3 below. Knowledge of how these trade scenarios do or will affect commodity prices can be used to enable dairy industry managers to minimize their industry's risk and to maximize profits by informing their decisions in regard to the management of their stocks, investments in the regional markets and the like.

TABLE 2

| | | Scenario: Base | | | | |
|---|---|---|---|---|---|---|
| | | | 2 | | 4 | 5 |
| | | 1 | No PC, | 3 | No PS, | No PS, |
| | Base | No Price | No | No PS, No | Partial | Partial |
| | Scenario: | Support | Cal/Fed | Fed MMO | MMO | MMO |
| | 1995 | (PS) | MMO | Class 1 | Dereg. 1 | Dereg. 2 |
| Commodity | Price | | | $/cwt change | | |
| Fluid milk | 13.97 | 0.05 | −1.95 | −1.69 | −0.05 | −0.01 |
| Soft products | 24.12 | −0.44 | 0.15 | 0.61 | −0.39 | −0.41 |
| Am. cheese | 117.59 | −0.62 | 4.84 | 4.17 | −1.43 | −1.14 |
| Butter | 68.90 | −5.02 | −4.85 | −4.94 | −5.16 | −5.17 |
| Nonfat dry milk | 91.85 | 1.73 | 15.02 | 7.99 | 7.58 | 3.97 |

TABLE 3

| | | Scenario: Base | | | | |
|---|---|---|---|---|---|---|
| | | | 2 | | 4 | 5 |
| | | 1 | No PC, | 3 | No PS, | No PS, |
| | | No Price | No | No PS, No | Partial | Partial |
| | | Support | Cal/Fed | Fed MMO | MMO | MMO |
| | | (PS) | MMO | Class 1 | Dereg. 1 | Dereg. 2 |
| Region | | | | $/cwt change | | |
| Northeast | | | | | | |
| Prod. surplus | 3,303 | −14 | 264 | −263 | −60 | −46 |
| Cons. surplus | 12,157 | 18 | 238 | 252 | 62 | 52 |

TABLE 3-continued

| | Scenario: Base | | | | |
|---|---|---|---|---|---|
| Region | 1 No Price Support (PS) | 2 No PC, No Cal/Fed MMO | 3 No PS, No Fed MMO Class 1 $/cwt change | 4 No PS, Partial MMO Dereg. 1 | 5 No PS, Partial MMO Dereg. 2 |
| Central | | | | | |
| Prod. surplus | 1,583 | −9 | −34 | −33 | −13 | −20 |
| Cons. surplus | 5,737 | 13 | 27 | 33 | 10 | 21 |
| Southeast | | | | | |
| Prod. surplus | 486 | −1 | −65 | −65 | −1 | −1 |
| Cons. surplus | 4,228 | 6 | 14 | 25 | 7 | 8 |

In Tables 2 and 3 above, Scenario 4 eliminates the price wedges for nonfat dry milk and butter in all MMOs, Scenario 5 Scenario 5 drops only the price wedge for nonfat dry milk in federal MMOs, and changes are compared to the base scenario (with price support (PS) at $10.10/cwt, and with both federal and California MMO) and are measured in $/cwt. In Table 3, the consumer surplus does not include the cost of the price support program paid by taxpayers.

Example 2

Method for Accurately Forecasting Prices of Dairy Commodities and Components Thereof in the World Dairy Market An example of applying the method and system of the present invention to the world dairy market was disclosed in U.S. patent application Ser. No. 09/775,946 filed 2001 Feb. 2, entitled "Method for Forecasting the Effects of Trade Policies and Supply and Demand Conditions on the World Dairy Sector," by inventors Thomas L. Cox, Jean-Paul Chavas and Yong Zhu, the disclosure of which is incorporated herein by reference.

The equilibrium function 210 was applied to the world dairy sector divided into several multi-country regions throughout the world. Five types of farm milk were considered (cow, buffalo, camel, sheep and goat) embodying several milk hedonic characteristics (fats, casein proteins, whey proteins, other nonfat solids (lactose, salts, other minerals and ash) and further fractionations thereof) that can be processed into eight types of dairy products (cheeses, butters, whole milk powders, skim milk powders, dry wheys, caseins, evaporated/condensed milks, and other dairy products). Regional designations were given above in the determining the regions step. Some of the results are presented in: Table 1 above. The reader is referred to the referenced application for further details regarding the methodology, forecast scenarios investigated and results.

System for Implementing the Method

A general-purpose computer, its component devices, and software, provide means for implementing the method steps described above (FIG. 7).

In an inputs database module 500, the inputs database 190 is created by inputting, pre-processing, and further manipulating (according to steps 100–140), the external database 90 and industry expert or analyst 95 inputs to the system. The inputs database software 510 resides on a program storage device 512 having a computer usable medium 514 for storing the program code. The program storage device 512 may be of a conventional variety, such as a conventional disk or memory device. The inputs database software 510 may be created using general-purpose application development tools such as programming languages, graphical design tools, and commercially available reusable software components. A general database engine may be used to manage inputs data storage and retrieval. The processor 520 is part of a general-purpose computer system. Any general-purpose computer may be used, provided that the processing power is sufficient to achieve the desired speed of computation for the amount of inputs data being processed by the system.

In an equilibrium function module 400, the equilibrium function (210 or 220) is refined according to step 250 and the function solved according to step 300 in conjunction with equilibrium function software 410 and a data processor 420. The equilibrium function software 410 resides on a program storage device 412 having a computer usable medium 414 for storing the program code. The program storage device 412 may be of a conventional variety, such as a conventional disk or memory device. The equilibrium function software 410 may be created using general-purpose application development tools such as programming languages, graphical design tools, and commercially available reusable software components. A general database engine may be used to manage data storage and retrieval. The processor 420 is part of a general-purpose computer system. Any general-purpose computer may be used, provided that the processing power is sufficient to achieve the desired speed of computation for the amount of data being processed by the system.

It should be noted that, though the inputs database module 500 and equilibrium function module 400 may be provided separately as described above, they, and their component parts, may alternatively be combined. That is, the modules (400 and 500) may be provided as combined into a single module in which the respective software (410 and 510) is fully integrated and shares a single program storage device and data processor.

Once the forecast results are stored in the results database 390, they may be used in deciding how to optimally allocate industrial or technological resources employed in the production, consumption or trading of the commodities. The results database 390 may be queried by an end user 392 who can request specific information from the system through a query 394 and thereby produce customized output 370. The system accommodates post-processing of the output data 370, allowing delivery in various formats and through various electronic media. The system can generate output 370 in the form of further analyses and presentation as graphs, spreadsheets, maps, HTML documents, or other formats. Because of the regional geographic nature of the output, it may be suited to a geographic presentation using mapping software. Queries 394 may be formulated to a user's specifications in order to create customized output to use in making management and/or procurement decisions. The output 370 can be delivered electronically through a variety of channels, including facsimile, e-mail, local area networks (LANs), wide area networks (WANs) and the worldwide web. It can also, of course, be provided in hard copy.

Of particular interest to inter-regionally based industries, the results database 390 itself, or customized output data 370, may be incorporated into an industry's information management system for intra-net online access (via a LAN or WAN) to enable industry-wide access to results such as annual forecast data, assumptions of the function (210 or 220), current forecast results (e.g. for production, consumption, stocks, imports, exports, and prices of commodities) by type of commodity and by region or country. An industry's buyers may also supply inputs to the system 95 (e.g., regional GDP and/or commodity demand and milk supply growth rates by year and by region or country) via the intra-net information system. In this way, the system of the present invention may be fully incorporated into an industry's information system to provide a seamless interface to their current management and procurement decision-making structure.

Advantages of the Invention

The previously described versions of the present invention have many advantages, including providing:

a) means for accurately approximating a multi-regional market in dairy commodities by expressly accounting for inter-regional variations in trade in primary, intermediate and processed commodities and the trade and/or domestic policies that affect the trade so as to enable the accurate forecasting of the prices and amounts of production, consumption and trade flow of those commodities across regions and under variable forecast scenarios;

b) a method and system for accurately forecasting future prices, production, consumption and trade flows of dairy commodities and components thereof regionally, on at least an annualized basis, and under variable trade and/or domestic policy forecast scenario;

c) a method and system for accurately forecasting dairy commodity price, production, consumption and trade flow levels that enables the incorporation of optimization functions to refine the forecasts of intermediate commodities use and thereby the final forecasts for attributes of all commodities and to reflect the effects of reconstitution technologies on the dairy commodities market; and, d) a method and system for accurately forecasting future prices, production, consumption and trade flows of dairy commodities and components thereof regionally, that enables a user to determine the regions at a global, national (e.g., U.S., Canada, Japan, etc.), or other regional (E.U.; U.S. and Canada; U.S., Canada and E.U., etc.) level.

Whereby, a management tool is provided to enable agricultural industry managers, including dairy industry managers, to generate accurate price forecasts for commodities and constituent components, and to specify optimal component mixtures for use in the production of processed commodities, so as to minimize their industry's market risk and to maximize profits by informing their decisions under variable trade scenarios, in regard to commodity and constituent component procurement strategies, investments in the regional markets for said commodities, the management of stocks of commodities and components, futures contracting, and the like.

The present invention does not require that all the advantageous features and all the advantages need to be incorporated into every embodiment thereof.

Closing

The reader's attention is directed to all papers and documents which are filed concurrently with this specification and which are open to public inspection with this specification, and the contents of all such papers and documents are incorporated herein by reference.

Although the present invention has been described in considerable detail with reference to certain preferred versions thereof, other versions are possible. All the features or steps disclosed in this specification (including any accompanying claims, abstract, and drawings) may be replaced by alternative features or steps serving the same, equivalent or similar purpose, unless expressly stated otherwise. Thus, unless expressly stated otherwise, each feature disclosed is one example only of a generic series of equivalent or similar features. Therefore, the spirit and scope of the appended claims should not be limited to the description of the preferred versions contained herein.

What is claimed is:

1. A method of using a computer for forecasting a price, an amount of consumption, an amount of production and an amount of trade flow of a plurality of primary and processed agricultural commodities, so as to enable their use to optimally allocate industrial or technological resources employed in the production, consumption or trading of said agricultural commodities based on said forecasted values for the commodity prices and amounts of consumption, production and trade flow, using said computer to perform the following steps comprising:

accessibly storing an inputs database;

creating the inputs database, comprising:
inputting to the inputs database a definition of a plurality of regions;
inputting to the inputs database a definition of an at least one forecast scenario in said regions comprising a set of trade policies on an amount of the primary and processed commodities imported and exported between the regions, and a set of domestic policies, one of the forecast scenarios being a base forecast scenario in which the set of trade policies and the set of domestic policies are set to recent values;
inputting to the inputs database a plurality of data from an at least one source database, the data comprising actual values for the price and amounts of consumption, production and trade flow in said regions over a plurality of recent years, said trade flow comprising the amount of imports and exports of the primary and processed commodities;

refining a multi-component spatial equilibrium function (210) approximating an inter-regional market in said primary and processed commodities;

forecasting the price and amounts of consumption, production and trade flow of the primary and processed commodities in the regions, by solving the refined function (210) under one of said at least one forecast scenarios over an at least annual time period;

if more than one forecast scenario is defined, repeating the forecasting step under each of said forecast scenarios;

accessibly storing a results database comprising the forecasted price and amounts of consumption, production and trade flow of the primary and processed commodities; and, outputting any of said results to use in deciding how to optimally allocate industrial or technological resources employed in the production, consumption or trading of said agricultural commodities.

2. The method of claim 1, wherein solving the function comprises maximizing a consumer and a producer surplus net of all of a plurality of transaction costs.

3. The method of claim 1, wherein the data further comprise values for a cost of transporting and marketing the primary and processed commodities, and a cost of processing the primary commodities into the processed commodities.

4. The method of claim 1, wherein creating the database further comprises:

transforming the data to be usable by the function; and, updating the inputs database.

5. The method of claim 1, wherein refining the function comprises repetitively solving the function under the base forecast scenario to produce a set of results, comparing the results to the data, and refining a plurality of parameters of the function until the results conform to the data.

6. The method of claim 1, wherein the agricultural commodities comprise dairy commodities.

7. The method of claim 6, wherein said primary commodities comprise cow, buffalo, camel, sheep and goat milk.

8. The method of claim 6, wherein said processed commodities comprise cheeses, butters, whole milk powders, skim milk powders, dry wheys, caseins, condensed milks, evaporated milks and other dairy products.

9. The method of claim 1, wherein the set of trade policies comprise within and over quota tariff rates on imports of the commodities and subsidy rates on exports of the commodities.

10. The method of claim 1, wherein said plurality of regions comprise regions throughout the world.

11. The method of claim 1, wherein said plurality of regions comprise regions within the United States.

12. The method of claim 1, wherein said plurality of regions comprise regions within Canada.

13. The method of claim 1, wherein said plurality of regions comprise regions within the European Union.

14. The method of claim 13, wherein said plurality of regions further comprise regions within the United States.

15. The method of claim 14, wherein said plurality of regions further comprise regions within Canada.

16. A method for using a computer for forecasting a price, an amount of consumption, an amount of production and an amount of trade flow of a plurality of primary, intermediate and processed agricultural commodities, the intermediate commodities being capable of reconstitution into a plurality of final processed commodities, so as to enable their use to optimally allocate industrial or technological resources employed in the production, consumption or trading of said agricultural commodities based on said forecasted values for the commodity prices and amounts of consumption, production and trade flow, using said computer to perform the following steps comprising:

accessibly storing an inputs database;
creating the inputs database comprising:
inputting to the inputs database a definition of a plurality of regions;
inputting to the inputs database a definition of an at least one forecast scenario in said regions comprising a set of trade policies on an amount of the primary, intermediate and processed commodities imported and exported between the regions, and a set of domestic policies, one of the forecast scenarios being a base forecast scenario in which the set of trade policies and the set of domestic policies are set to recent values;

inputting to the inputs database a plurality of data from an at least one source database, the data comprising actual values for the price and amounts of consumption, production and trade flow in said regions, said trade flow comprising the amount of imports and an amount of exports of the primary, intermediate and processed commodities over a plurality of recent years;

refining a multi-component spatial equilibrium function approximating an inter-regional market in said primary, intermediate and processed commodities;

forecasting the price and amounts of consumption, production and trade flow of the primary, intermediate and processed commodities in the regions, by solving the refined function under one of said at least one forecast scenarios over an at least annual time period;

if more than one forecast scenario is defined, repeating the forecasting step under each of said forecast scenarios;

accessibly storing a results database comprising the forecasted price and amounts of consumption, production and trade flow of the primary and processed commodities; and, outputting any of said results to use in deciding how to optimally allocate industrial or technological resources employed in the production, consumption or trading of said agricultural commodities.

17. The method of claim 16, wherein the equilibrium function comprises a function (220).

18. The method of claim 16, wherein solving the function comprises maximizing a consumer and a producer surplus net of all of a plurality of transaction costs.

19. The method of claim 16, wherein the data further comprise values for a cost of transporting and marketing the primary, intermediate and processed commodities, and a cost of processing the primary and the intermediate commodities into the processed commodities.

20. The method of claim 16, wherein creating the database further comprises:

transforming the data to be usable by the function; and, updating the inputs database.

21. The method of claim 16, wherein refining the function comprises repetitively solving the function under the base forecast scenario to produce a set of results, comparing the results to the data, and refining a plurality of parameters of the function until the results conform to the data.

22. The method of claim 16, further comprising solving for an optimal amount of intermediate commodities consumed in the making of an at least one type of processed commodity by region under an assumption of optimal use, given the forecasted amount of processed commodities produced and an amount of intermediate commodities available for consumption in each of the regions.

23. The method of claim 22, wherein the amount of intermediate commodities available in each region comprises the forecasted amount of production of intermediate commodities in said region and the forecasted amount of intermediate commodities imported into said region.

24. The method of claim 23, further comprising iterating the forecasting and solving steps using the solution for the optimal amount of intermediate commodities consumed until the difference between results of consecutive iterations approaches 0.

25. The method of claim 22, wherein the type of processed commodity comprises an at least one type of cheese.

26. The method of claim 16, wherein the set of trade policies comprise within and over quota tariff rates on imports of the commodities and subsidy rates on exports of the commodities.

27. The method of claim 16, wherein said plurality of regions comprise regions throughout the world.

28. The method of claim 16, wherein said plurality of regions comprise regions within the United States.

29. The method of claim 16, wherein said plurality of regions comprise regions within Canada.

30. The method of claim 16, wherein said plurality of regions comprise regions within the European Union.

31. The method of claim 30, wherein said plurality of regions further comprise regions within the United States.

32. The method of claim 31, wherein said plurality of regions further comprise regions within Canada.

33. The method of claim 16, wherein the agricultural commodities comprise dairy commodities.

34. The method of claim 33, wherein said primary commodities comprise cow, buffalo, camel, sheep and goat milk.

35. The method of claim 33, wherein said processed commodities comprise cheeses, butters, whole milk powders, skim milk powders, dry wheys, caseins, condensed milks, evaporated milks and other dairy products.

36. The method of claim 33, wherein said intermediate commodities comprise butters, butter oils, skim milk powders, whole milk powders, condensed milks, evaporated milks, caseins, dry wheys, milk protein concentrates and other products embodying fractionated milk components.

37. An apparatus for forecasting a price, an amount of consumption, an amount of production and an amount of trade flow of a plurality of primary, intermediate and processed commodities, the intermediate agricultural commodities being capable of reconstitution into a plurality of final processed commodities, so as to enable their use to optimally allocate industrial or technological resources employed in the production, consumption or trading of said agricultural commodities based on said forecasted values for the commodity prices and amounts of consumption, production and trade flow, the apparatus comprising:

means for creating an inputs database comprising:
means for inputting to the inputs database a definition of a plurality of regions;
means for inputting to the inputs database a definition of an at least one forecast scenario in said regions comprising a set of trade policies on an amount of the primary, intermediate and processed commodities imported and exported between the regions, and a set of domestic policies, one of the forecast scenarios being a base forecast scenario in which the set of trade policies and the set of domestic policies are set to recent values;
means for inputting to the inputs database a plurality of data from an at least one source database, the data comprising actual values for the price and amounts of consumption, production and trade flow in said regions, said trade flow comprising the amount of imports and exports of the primary, intermediate and processed commodities over a plurality of recent years;
means for refining a multi-component spatial equilibrium function approximating an inter-regional market in said primary, intermediate and processed commodities;
means for forecasting the price and amounts of consumption, production and trade flow of the primary, intermediate and processed commodities in the regions, by solving the refined function under one of said at least one forecast scenarios over an at least annual time period;
if more than one forecast scenario is defined, means for repeating the forecasting step under each of said forecast scenarios; and,
means for outputting the forecasted price and amounts of consumption, production and trade flow of the primary, intermediate and processed commodities to a results database and using the forecasts in deciding how to optimally allocate industrial or technological resources employed in the production, consumption or trading of said agricultural commodities.

38. The apparatus of claim 37, wherein the equilibrium function comprises a function (220).

39. The apparatus of claim 37, wherein solving the function comprises maximizing a consumer and a producer surplus net of all of a plurality of transaction costs.

40. The apparatus of claim 37, wherein the data further comprise values for a cost of transporting and marketing the primary, intermediate and processed commodities, and a cost of processing the primary and the intermediate commodities into the processed commodities.

41. The apparatus of claim 37, wherein means for creating the database further comprises:
means for transforming the data to be usable by the function; and,
means for updating the inputs database.

42. The apparatus of claim 37, wherein means for refining the function comprises repetitively solving the function under the base forecast scenario to produce a set of results, comparing the results to the data, and refining a plurality of parameters of the function until the results conform to the data.

43. The apparatus of claim 37, further comprising solving for an optimal amount of intermediate commodities consumed in making an at least one type of processed commodity by region under an assumption of optimal use, given the forecasted amount of processed commodities produced and an amount of intermediate commodities available for consumption in each of the regions.

44. The apparatus of claim 43, wherein the amount of intermediate commodities available in each region comprises the forecasted amount of production of intermediate commodities in said region and the forecasted amount of intermediate commodities imported into said region.

45. The apparatus of claim 44, further comprising iterating the forecasting and solving steps using the solution for the optimal amount of intermediate commodities consumed until the difference between results of consecutive iterations approaches 0.

46. The apparatus of claim 43, wherein the type of processed commodity comprises an at least one type of cheese.

47. The apparatus of claim 37, wherein the agricultural commodities comprise dairy commodities.

48. A program storage device readable by a machine, tangibly embodying a program of instructions executable by the machine to perform method steps for forecasting a price, an amount of consumption, an amount of production and an amount of trade flow of a plurality of primary, intermediate and processed agricultural commodities, so as to enable their use to optimally allocate industrial or technological resources employed in the production, consumption or trading of said agricultural commodities based on said forecasted values for the commodity prices and amounts of consumption, production and trade flow, the method steps comprising:

accessibly storing a plurality of input data comprising a definition of a plurality of regions, a definition of an at least one forecast scenario, and a plurality of current values for the price and amounts of consumption, production and trade flow in said regions, said trade flow comprising an amount of imports and an amount of exports of the primary, intermediate and processed commodities over a plurality of recent years;

refining a multi-component spatial equilibrium function approximating an inter-regional market in said primary, intermediate and processed commodities;

forecasting the price and amounts of consumption, production and trade flow of the primary, intermediate and processed commodities in the regions, by solving the refined function under one of said at least one forecast scenarios over an at least annual time period;

if more than one forecast scenario is defined, repeating the forecasting step under each of said forecast scenarios; and, outputting the forecasted price and amounts of consumption, production and trade flow of the primary, intermediate and processed commodities to a results database and using the forecasts in deciding how to optimally allocate industrial or technological resources employed in the production, consumption or trading of said dairy commodities.

49. The program storage device of claim 48, herein the equilibrium function comprises a function (220).

50. The program storage device of claim 48, wherein solving the refined function comprises maximizing a consumer and a producer surplus net of all of a plurality of transaction costs.

51. The program storage device of claim 48, in the data further comprise values for a cost of transporting and marketing the primary, intermediate and processed commodities, and a cost of processing the primary and the intermediate commodities into the processed commodities.

52. The program storage device of claim 48, wherein the method step of creating the database further comprises:
transforming the data to be usable by the function; and,
updating the inputs database.

53. The program storage device of claim 48, wherein the method step of refining the function comprises repetitively solving the function under the base forecast scenario to produce a set of results, comparing the results to the data, and refining a plurality of parameters of the function until the results conform to the data.

54. The program storage device of claim 48, wherein the agricultural commodities comprise dairy commodities.

55. The program storage device of claim 48, wherein the at least one forecast scenario comprises a set of trade policies on the amount of the primary, intermediate and processed commodities imported and exported between the regions, and a set of domestic policies, one of the forecast scenarios being a base forecast scenario in which the set of trade policies and the set of domestic policies are set to recent values.

56. The program storage device of claim 48, further comprising solving for an optimal amount of intermediate commodities consumed in making an at least one type of processed commodity by region under an assumption of optimal use, given the forecasted amount of processed commodities produced and an amount of intermediate commodities available for consumption in each of the regions.

57. The program storage device of claim 56, wherein the amount of intermediate commodities available in each region comprises the forecasted amount of production of intermediate commodities in said region and the forecasted amount of intermediate commodities imported into said region.

58. The program storage device of claim 57, further comprising iteratively repeating the forecasting and solving steps using the solution for the optimal amount of intermediate commodities consumed until a difference between results of consecutive iterative repetitions approaches 0.

59. An article of manufacture comprising a computer-usable medium having computer-readable program code means embodied in said medium for forecasting a price, an amount of consumption, an amount of production and an amount of trade flow of a plurality of primary, intermediate and processed agricultural commodities, so as to enable their use to optimally allocate industrial or technological resources employed in the production, consumption or trading of said agricultural commodities based on said forecasted values for the commodity prices and amounts of consumption, production and trade flow, the computer-readable program code means comprising:

computer readable program code means for storing a plurality of input data comprising a definition of a plurality of regions, a definition of an at least one forecast scenario, and a plurality of current values for the price and amounts of consumption, production and trade flow in said regions, said trade flow comprising an amount of imports and an amount of exports of the primary, intermediate and processed commodities over a plurality of recent years;

computer readable program code means for refining a multi-component spatial equilibrium function approximating an inter-regional market in said primary, intermediate and processed commodities;

computer readable program code means for forecasting the price and amounts of consumption, production and trade flow of the primary, intermediate and processed commodities in the regions, by solving the refined function under one of said at least one forecast scenarios over an at least annual time period;

if more than one forecast scenario is defined, computer readable program code means for repeating the forecasting step under each of said forecast scenarios; and, computer readable program code means for outputting the forecasted price and amounts of consumption, production and trade flow of the primary, intermediate and processed commodities to a results database and using the forecasts in deciding how to optimally allocate industrial or technological resources employed in the production, consumption or trading of said agricultural commodities.

60. The article of manufacture of claim 59, wherein the equilibrium function comprises a function (220).

61. The article of manufacture of claim 59, wherein the computer readable program code means for solving the function comprises maximizing a consumer and a producer surplus net of all of a plurality of transaction costs.

62. The article of manufacture of claim 59, wherein the data further comprise values for a cost of transporting and marketing the primary, intermediate and processed commodities, and a cost of processing the primary and the intermediate commodities into the processed commodities.

63. The article of manufacture of claim 59, wherein the computer readable program code means for creating the database further comprises:
computer readable program code means for transforming the data to be usable by the function; and,
computer readable program code means for updating the inputs database.

64. The article of manufacture of claim 59, wherein the computer readable program code means for refining the function comprises repetitively solving the function under the base forecast scenario to produce a set of results, comparing the results to the data, and refining a plurality of parameters of the function until the results conform to the data.

65. The article of manufacture of claim 59, wherein the agricultural commodities comprise dairy commodities.

66. The article of manufacture of claim 59, wherein the at least one forecast scenario comprises a set of trade policies on the amount of the primary, intermediate and processed commodities imported and exported between the regions, and a set of domestic policies, one of the forecast scenarios being a base forecast scenario in which the set of trade policies and the set of domestic policies are set to recent values.

67. The article of manufacture of claim 59, further comprising solving for an optimal amount of intermediate commodities consumed in the making of an at least one type of processed commodity by region under an assumption of optimal use, given the forecasted amount of processed commodities produced and an amount of intermediate commodities available for consumption in each of the regions.

68. The article of manufacture of claim 67, wherein the amount of intermediate commodities available in each region comprises the forecasted amount of production of intermediate commodities in said region and the forecasted amount of intermediate commodities imported into said region.

69. The article of manufacture of claim 68, further comprising iteratively repeating the forecasting and solving steps using the solution for the optimal amount of intermediate commodities consumed until a difference between results of consecutive iterative repetitions approaches 0.

70. A computer program product comprising:
a computer usable medium and computer readable code embodied on said computer useable medium for causing the forecasting of a price, an amount of consumption, an amount of production and an amount of trade flow of a plurality of primary, intermediate and processed agricultural commodities, so as to enable their use to optimally allocate industrial or technological resources employed in the production, consumption or trading of said agricultural commodities based on said forecasted values for the commodity prices and amounts of consumption, production and trade flow, the computer-readable code comprising:
computer readable program code devices configured to cause the computer to effect the storing of a plurality of input data comprising a definition of a plurality of regions, a definition of an at least one forecast scenario, and a plurality of current values for the price and amounts of consumption, production and trade flow in said regions, said trade flow comprising an amount of imports and an amount of exports of the primary, intermediate and processed commodities over a plurality of recent years;
computer readable program code devices configured to cause the computer to effect the refining of a multi-component spatial equilibrium function approximating an inter-regional market in said primary, intermediate and processed commodities;
computer readable program code devices configured to cause the computer to effect the forecasting of the price and amounts of consumption, production and trade flow of the primary, intermediate and processed commodities in the regions, by solving the refined function under one of said at least one forecast scenarios over an at least annual time period;
if more than one forecast scenario is defined, computer readable program code devices configured to cause the computer to effect the repeating of the forecasting step under each of said forecast scenarios; and,
computer readable program code devices configured to cause the computer to effect the outputting of the forecasted price and amounts of consumption, production and trade flow of the primary, intermediate and processed commodities to a results database and using the forecasts in deciding how to optimally allocate industrial or technological resources employed in the production, consumption or trading of said agricultural commodities.

71. The computer program product of claim 70, wherein the equilibrium function comprises a function (220).

72. The computer program product of claim 70, wherein solving the function comprises maximizing a consumer and a producer surplus net of all of a plurality of transaction costs.

73. The computer program product of claim 70, wherein the data further comprise values for a cost of transporting and marketing the primary, intermediate and processed commodities, and a cost of processing the primary and the intermediate commodities into the processed commodities.

74. The computer program product of claim 70, wherein the computer readable program code devices configured to cause the computer to effect the creating of the database further comprises:
computer readable program code devices configured to cause the computer to effect the transforming of the data to be usable by the function; and,
computer readable program code devices configured to cause the computer to effect an updating of the inputs database.

75. The computer program product of claim 70, wherein the computer readable program code devices configured to cause the computer to effect the refining of the function comprises repetitively solving the function under the base forecast scenario to produce a set of results, comparing the results to the data, and refining a plurality of parameters of the function until the results conform to the data.

76. The computer program product of claim 70, wherein the agricultural commodities comprise dairy commodities.

77. The computer program product of claim 70, wherein the at least one forecast scenario comprises a set of trade policies on the amount of the primary, intermediate and processed commodities imported and exported between the regions, and a set of domestic policies, one of the forecast scenarios being a base forecast scenario in which the set of trade policies and the set of domestic policies are set to recent values.

78. The computer program product of claim 70, further comprising solving for an optimal amount of intermediate commodities consumed in making an at least one type of processed commodity by region under an assumption of optimal use, given the forecasted amount of processed commodities produced and an amount of intermediate commodities available for consumption in each of the regions.

79. The computer program product of claim 70, wherein the amount of intermediate commodities available in each region comprises the forecasted amount of production of intermediate commodities in said region and the forecasted amount of intermediate commodities imported into said region.

80. The computer program product of claim 79, further comprising iteratively repeating the forecasting and solving steps using the solution for the optimal amount of intermediate commodities consumed until a difference between results of consecutive iterative repetitions approaches 0.

* * * * *

UNITED STATES PATENT AND TRADEMARK OFFICE
CERTIFICATE OF CORRECTION

| | |
|---|---|
| PATENT NO. | : 6,865,542 B2 |
| DATED | : March 8, 2005 |
| INVENTOR(S) | : Thomas L. Cox, Jean-Paul Chavas and Yong Zhu |

It is certified that error appears in the above-identified patent and that said Letters Patent is hereby corrected as shown below:

<u>Column 40,</u>
Line 55, should read -- The computer program product of claim 78, wherein --

Signed and Sealed this

Twenty-first Day of June, 2005

JON W. DUDAS
*Director of the United States Patent and Trademark Office*